US010386189B2

(12) United States Patent
Kushleyev et al.

(10) Patent No.: US 10,386,189 B2
(45) Date of Patent: Aug. 20, 2019

(54) UTILIZING PROCESSING UNITS TO CONTROL TEMPERATURE

(71) Applicant: QUALCOMM Incorporated, San Diego, CA (US)

(72) Inventors: Aleksandr Kushleyev, Philadelphia, PA (US); Rizwan Ahmed, Haddonfield, NJ (US); Daniel Warren Mellinger, III, Philadelphia, PA (US); Matthew Hyatt Turpin, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 15/401,611

(22) Filed: Jan. 9, 2017

(65) Prior Publication Data

US 2018/0094933 A1    Apr. 5, 2018

Related U.S. Application Data

(60) Provisional application No. 62/403,817, filed on Oct. 4, 2016.

(51) Int. Cl.
| | |
|---|---|
| *G01K 1/20* | (2006.01) |
| *G01C 21/16* | (2006.01) |
| *G01C 21/18* | (2006.01) |
| *G01C 25/00* | (2006.01) |
| *G01K 15/00* | (2006.01) |

(Continued)

(52) U.S. Cl.
CPC .......... *G01C 21/165* (2013.01); *G01C 21/18* (2013.01); *G01C 25/00* (2013.01); *G01D 3/0365* (2013.01); *G01K 15/005* (2013.01); *G05B 15/02* (2013.01); *G05D 23/1917* (2013.01); *G06F 11/3058* (2013.01)

(58) Field of Classification Search
CPC .................................................... G01C 21/165
USPC .......................................................... 702/99
See application file for complete search history.

(56) References Cited

U.S. PATENT DOCUMENTS

| 7,340,366 B2 | 3/2008 | Aas et al. |
| 9,366,583 B2 | 6/2016 | Xiang et al. |

(Continued)

FOREIGN PATENT DOCUMENTS

EP    2801804 A1    11/2014

OTHER PUBLICATIONS

International Search Report and Written Opinion—PCT/US2017/045318—ISA/EPO—dated Nov. 7, 2017.

*Primary Examiner* — Hien D Khuu
(74) *Attorney, Agent, or Firm* — The Marbury Law Group, PLLC

(57) ABSTRACT

Various embodiments include methods for performing temperature calibration of a first temperature sensitive unit with an electronic device having a first processing unit that is thermally coupled to the first temperature sensitive unit. Various embodiments may include determining a current temperature of the first temperature sensitive unit, determining a processing load for the first processing unit based on the current temperature and a target temperature, applying the determined processing load to the first processing unit to vary a temperature of the first temperature sensitive unit, and determining a temperature bias for the first temperature sensitive unit at the temperature of the first temperature sensitive unit based on an output of the first temperature sensitive unit.

30 Claims, 10 Drawing Sheets

(51) Int. Cl.
   *G05B 15/02*    (2006.01)
   *G05D 23/19*    (2006.01)
   *G01D 3/036*    (2006.01)
   *G06F 11/30*    (2006.01)

(56) References Cited

U.S. PATENT DOCUMENTS

| | | | |
|---|---|---|---|
| 2005/0049729 A1* | 3/2005 | Culbert | G06F 1/206 |
| | | | 700/50 |
| 2005/0081112 A1 | 4/2005 | Aguilar et al. | |
| 2009/0146746 A1 | 6/2009 | Unkrich et al. | |
| 2010/0117579 A1* | 5/2010 | Culbert | G06F 1/20 |
| | | | 318/471 |
| 2013/0060499 A1 | 3/2013 | Yoshimura | |
| 2013/0099842 A1 | 4/2013 | Kuo et al. | |
| 2013/0160003 A1* | 6/2013 | Mann | G06F 9/5088 |
| | | | 718/1 |
| 2013/0269030 A1 | 10/2013 | Milford | |
| 2014/0328367 A1* | 11/2014 | Niederberger | G01K 1/20 |
| | | | 374/1 |
| 2015/0009335 A1 | 1/2015 | Strandemar et al. | |
| 2017/0194965 A1* | 7/2017 | Yonezawa | H03L 1/00 |
| 2018/0232023 A1* | 8/2018 | Culbert | G06F 1/20 |
| 2018/0321328 A1* | 11/2018 | Kushleyev | G01R 33/0029 |

\* cited by examiner

UTILIZING PROCESSING UNITS TO CONTROL TEMPERATURE

RELATED APPLICATIONS

This application claims the benefit of priority to U.S. Provisional Application No. 62/403,817 entitled "Utilizing Processing Units to Control Temperature" filed Oct. 4, 2016, the entire contents of which are hereby incorporated by reference.

BACKGROUND

The performance or output of some electronic components is affected by the temperature at which they operate. Sometime referred to as a temperature bias, such temperature affects may change the output of an electronic component depending on the temperature of the component. For example, an inertial measurement unit (IMU) is a system that measures linear and angular motion of an object on which it is mounted (e.g., an unmanned aerial vehicle (UAV) or drone). An IMU typically includes one or more gyroscopes and accelerometers that are used to detect motion, acceleration, and changes in orientation (e.g., pitch, roll, yaw). The gyroscopes and accelerometers on an IMU may be temperature sensitive such that their output may be affected by the temperature of the IMU. If not properly accounted for or calibrated, such temperature biases may render the output of the IMU inaccurate. Examples of other electronic components that are temperature sensitive include, but are not limited to, oscillators, power amplifiers, and radio frequency (RF) resources. Such temperature sensitive components may be exposed to heat from nearby components, such as processors that heat up during operation, which may render their output inaccurate unless a proper compensation or calibration is applied.

In order to correct for the temperature bias of an electronic component, the component is usually calibrated in the factory before shipment. Calibration typically involves heating the component (or the device containing the component) to a target temperature or through a temperature range while measuring the output of the component and computing a correction factor.

SUMMARY

Various embodiments include methods for using the thermal output of processing components within an electronic device (e.g., a computing device) to provide temperature control for various purposes by modifying the processing load on the processing components. Various embodiments enable temperature control of electronic devices including processing components without the need for internal or external heaters.

Some embodiments include performing temperature calibration of a first temperature sensitive unit with an electronic device having a first processing unit that is thermally coupled to the first temperature sensitive unit. Such embodiments may include determining a current temperature of the first temperature sensitive unit, determining a processing load for the first processing unit based on the current temperature and a target temperature, applying the determined processing load to the first processing unit to vary a temperature of the first temperature sensitive unit, and determining a temperature bias for the first temperature sensitive unit at the temperature of the first temperature sensitive unit based on an output of the first temperature sensitive unit.

In some embodiments, applying the determined processing load to the first processing unit may include executing a thread on the first processing unit to achieve the determined processing load. In some embodiments, applying the determined processing load to the first processing unit may include executing a thread on the first processing unit according to a duty cycle to achieve the determined processing load. In some embodiments, executing the thread on the first processing unit according to a duty cycle may include executing dummy instructions based on a clock cycle of the first processing unit. In some embodiments, determining a processing load for the first processing unit based on the current temperature and a target temperature may include determining the processing load for the first processing unit based on the target temperature and a difference between the target temperature and the current temperature.

Some embodiments may further include determining whether the first temperature sensitive unit has reached the target temperature for a threshold amount of time, and in response to determining that the first temperature sensitive unit has not reached the target temperature for the threshold amount of time re-determining the current temperature of the first temperature sensitive unit, re-determining the processing load for the first processing unit based on the current temperature and another target temperature, and applying the re-determined processing load on the first processing unit. In such embodiments, determining a temperature bias for the first temperature sensitive unit based on the temperature of the first temperature sensitive unit and an output of the first temperature sensitive unit may be performed in response to determining that the first temperature sensitive unit has reached the target temperature for the threshold amount of time.

Some embodiments may further include selecting the target temperature from a plurality of target temperatures, determining whether all of the plurality of target temperatures have been selected after determining the temperature bias for the first temperature sensitive unit at the selected target temperature, and in response to determining that not all of the plurality of target temperatures have been selected selecting another target temperature among the plurality of target temperatures, determining a processing load for the first processing unit based on the current temperature and the selected target temperature, applying the determined processing load to the first processing unit to bring the temperature of the first temperature sensitive unit to the selected target temperature, and determining a temperature bias for the first temperature sensitive unit at the selected target temperature based on an output of the first temperature sensitive unit. Such embodiments may further include determining a temperature bias curve for the first temperature sensitive unit based on temperature biases determined at each of the plurality of target temperatures in response to determining that all of the plurality of target temperatures have been selected.

Some embodiments may further include adjusting a rate of increase in temperature of the first temperature sensitive unit by adjusting the threshold amount of time at which the first temperature sensitive unit is held at each selected target temperatures before determining the temperature bias for the first temperature sensitive unit at each selected target temperature.

In various embodiments, the first processing unit may be one of a central processing unit, a graphics processing unit, a digital signal processor, a power amplifier, an encoder, and a decoder. In various embodiments, the first temperature sensitive unit may be one of an inertial measurement unit, an oscillator, a power amplifier, and a radio frequency resource.

Some embodiments may further include determining a current temperature of a plurality of temperature sensitive units including the first temperature sensitive unit, determining a processing load for the processing unit based on the current temperature of each of the plurality of temperature sensitive units and a target temperature of each of the plurality of temperature sensitive units, applying the determined processing load to the processing unit to vary a temperature of the each of the plurality of temperature sensitive units, and determining a temperature bias for each of the plurality of temperature sensitive units at the temperature of each of the plurality of temperature sensitive units based on an output of each of the plurality of temperature sensitive units.

Some embodiments may include determining a processing load for a plurality of processing units including the first processing unit based on the current temperature of the first temperature sensitive unit and the target temperature, and applying the determined processing load to each of the plurality of processing units to vary the temperature of the first temperature sensitive unit. In some embodiments, determining the current temperature of the first temperature sensitive unit, determining the processing load for the first processing unit, and determining the temperature bias for the first temperature sensitive unit may be performed by a second processing unit in the electronic device. Some embodiments may further include varying the temperature of the first temperature sensitive unit by varying a load on the first processing unit during run time.

Some embodiments include methods for performing temperature testing of a first temperature sensitive unit with an electronic device having a first processing unit that is thermally coupled to the first temperature sensitive unit. Such embodiments may include determining a current temperature of the first temperature sensitive unit, determining a processing load for the first processing unit based on the current temperature and a target temperature, applying the determined processing load to the first processing unit to vary a temperature of the first temperature sensitive unit, compensating an output of the first temperature sensitive unit at the target temperature, and determining a performance for the first temperature sensitive unit at the target temperature based on the compensated output.

Further embodiments include an electronic device, such as a computing device, including a first processing unit configured with processor-executable instructions to perform operations of the methods summarized above. Further embodiments include a non-transitory processor-readable storage medium having stored thereon processor-executable software instructions configured to cause a first processing unit of an electronic device to perform operations of the methods summarized above. Further embodiments include an electronic device that includes means for performing functions of the operations of the methods summarized herein.

BRIEF DESCRIPTION OF THE DRAWINGS

The accompanying drawings, which are incorporated herein and constitute part of this specification, illustrate exemplary embodiments of the claims, and together with the general description and the detailed description given herein, serve to explain the features of the claims.

DETAILED DESCRIPTION

Figure 1:
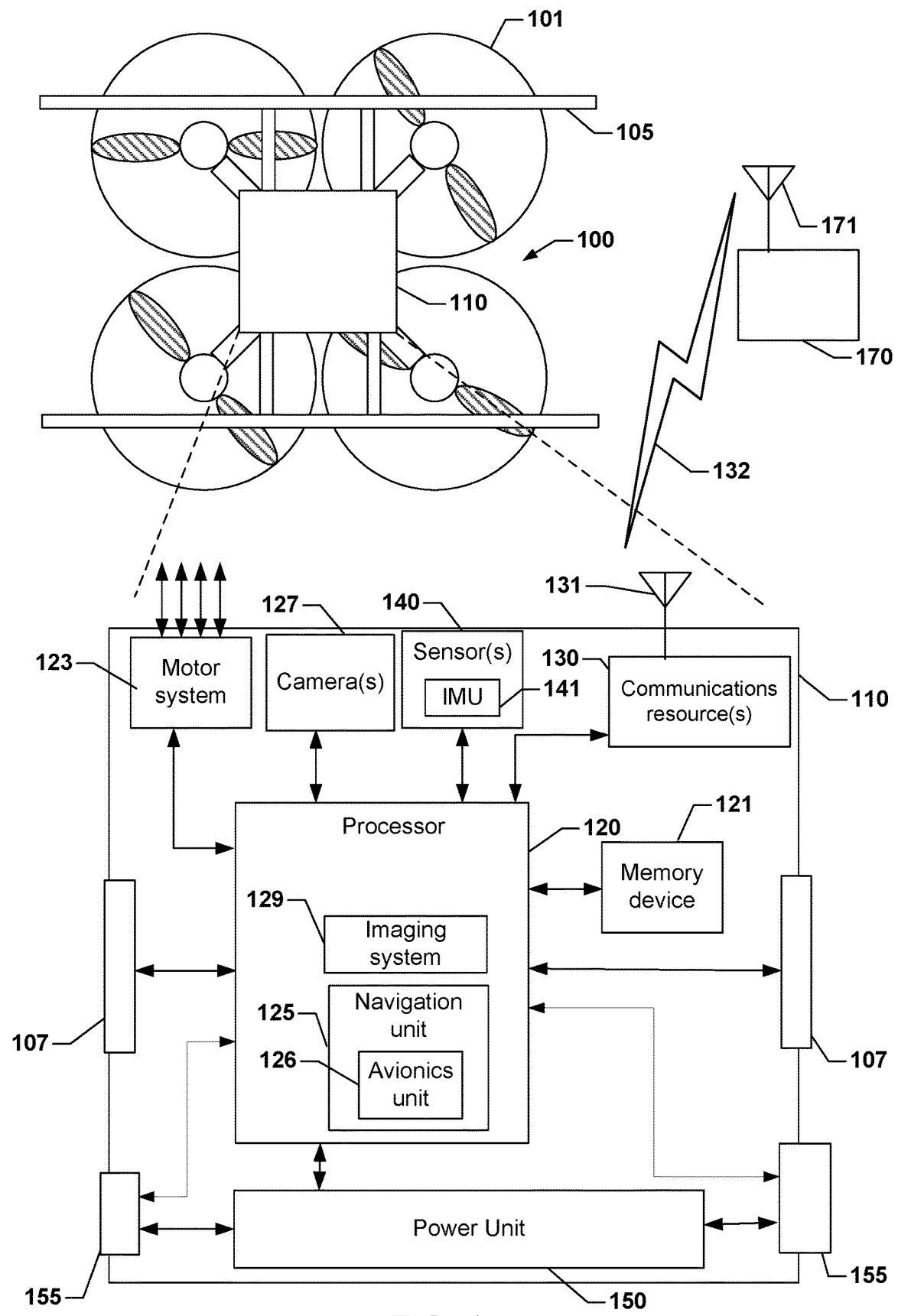
FIG. 1 is a block diagram illustrating components of a typical unmanned aerial vehicle (UAV) system suitable for use in various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods of using processing devices (e.g., one or more processing cores of a multi-core processor) within an electronic device to control the temperature of a temperature-sensitive unit so that temperature effects on performance or output of the unit (e.g., a temperature bias) can be determined or measured without the use of heaters. The various embodiments may enable calibration or measurements of temperature bias to be performed periodically without requiring heating elements to be built into the electronic device. Some embodiments may use processing devices in an open loop manner to raise the temperature of an electronic device to a high temperature.

Some electronic devices may contain temperature sensitive units, which exhibit a temperature bias. In other words, given a constant input the output of a temperature sensitive unit may vary based on the temperature of the temperature sensitive unit. This may render the output of the temperature sensitive unit inaccurate. For example, the IMU in a UAV may be temperature sensitive. In another example, the RF resource (e.g., front end) of a mobile communication device may be temperature sensitive and experience insertion loss as temperature varies. Other examples of temperature sensitive units include oscillators, which experience frequency errors due to temperature bias, and power amplifiers, which experience variances in gain due to temperature bias. Temperature sensitive units in electronic devices may be exposed to heat from other components or from the environment, which introduces errors in the output of the temperature sensitive unit.

In order to correct for the temperature bias of a temperature sensitive unit, the component is usually calibrated in the factory before being shipped. Calibration may involve measuring the bias of the temperature sensitive unit over a temperature range and computing a data fit (e.g., a least-squares linear fit) for the correction extrapolated over the entire operating temperature range, or using a lookup table. However, temperature calibration may be cumbersome due to the need to heat the temperature sensitive unit during the procedure. This calibration is time consuming and usually involves the use of specialized external equipment (e.g., an oven to heat the temperature sensitive unit, large heating resistors to dissipate the heat). In addition, the rate of temperature change may be difficult to control without feedback.

Various systems and methods described herein provide a way to perform temperature calibration of a temperature sensitive unit utilizing pre-existing components in the same electronic device. For example, a temperature sensitive unit may be calibrated using a processing unit that is thermally coupled to the temperature sensitive unit (e.g., via a circuit board). The processing unit may be, for example, a central processing unit, a graphics processing unit, a digital signal processor, a power amplifier, an encoder, or a decoder. The temperature sensitive unit may be, for example, an inertial measurement unit, an oscillator, a power amplifier, or a RF resource.

A thread may be executed on the processing unit, and a load is applied to the thread. Varying the load on the thread may vary the temperature of the processing unit, thereby varying the temperature of the temperature sensitive unit thermally coupled to the processing unit. The processing unit may also be designed to dissipate heat quickly, thus enabling cooling of the temperature sensitive unit without the need for a heating resistor. Thus, the processing unit may be used to calibrate the temperature sensitive unit. The load of the thread may be varied based on a difference between the current temperature of the temperature sensitive unit and a target temperature. When the target temperature is achieved in the temperature sensitive unit a temperature bias for the temperature sensitive unit may be determined based on the target temperature and an output of the temperature sensitive unit. Such a temperature bias measurement may be used to correct the output of the temperature sensitive unit. Controlling the load on a thread executing in the processing unit may also be used to vary the temperature of the temperature sensitive unit during run time of the electronic device. In some embodiments, the load on the processing unit or units may be maximized without variation (i.e., in an open loop manner) to raise the temperature of the electronic device to as high a temperature as can be achieved under ambient conditions using only the processing unit or units. By using a processing unit, the various embodiments may enable performance of temperature calibrations and determining the impact of temperature on performance (or performance of components at various operating temperatures) without the need for incorporating large heating resistors into the electronic device. Such capabilities may enable the fabrication of smaller and lighter electronic components, which may provide benefits for aerial drones that are weight and/or size limited.

The terms Global Positioning System (GPS) and Global Navigation Satellite System (GNSS) are used interchangeably herein to refer to any of a variety of satellite-aided navigation systems, such as GPS deployed by the United States, GLObal NAvigation Satellite System (GLONASS) used by the Russian military, and Galileo for civilian use in the European Union, as well as terrestrial communication systems that augment satellite-based navigation signals or provide independent navigation information.

FIG. 1 illustrates an example UAV 100 for use with various embodiments disclosed herein. The UAV 100 illustrated in FIG. 1 is a "quad copter" having four horizontally configured rotary lift propellers, or rotors 101 and motors fixed to a frame 105, however UAV's may have more or fewer rotors. The frame 105 may support a control unit 110, landing skids and the propulsion motors, power source (power unit 150) (e.g., battery), payload securing mechanism (payload securing unit 107), and other components.

The UAV 100 may include a control unit 110, which may include a processor 120, communication resource(s) 130, sensor(s) 140, and a power unit 150. The processor 120 may be coupled to a memory unit 121 and a navigation unit 125. The processor 120 may be configured with processor-executable instructions to control flight and other operations of the UAV 100, including operations of various embodiments. In some embodiments, the processor 120 may be coupled to a payload securing unit 107 and landing unit 155. The processor 120 may be powered from the power unit 150, such as a battery. The processor 120 may be configured with processor-executable instructions to control the charging of the power unit 150, such as by executing a charging control algorithm using a charge control circuit. Alternatively or additionally, the power unit 150 may be configured to manage charging. The processor 120 may be coupled to a motor system 123 that is configured to manage the motors that drive the rotors 101. The motor system 123 may include one or more propeller drivers. Each of the propeller drivers includes a motor, a motor shaft, and a propeller.

Through control of the individual motors of the rotors 101, the UAV 100 may be controlled in flight. In the processor 120, a navigation unit 125 may collect data and determine the present position and orientation of the UAV 100, the appropriate course towards a destination, and/or the best way to perform a particular function.

An avionics component 126 of the navigation unit 125 may be configured to provide flight control-related information, such as altitude, attitude, airspeed, heading and similar information, to a processor within the navigation unit 125 and/or to the UAV processor 120 for use in navigation and flight control. The avionics component 126 may also provide data regarding the orientation and accelerations of the UAV 100 that may be used in navigation calculations. In some embodiments, the information generated by the navigation unit 125, including the avionics component 126, depends on the capabilities and types of sensor(s) 140 on the UAV 100.

The control unit 110 may include one or more communication resources 130, which may be coupled to at least one transmit/receive antenna 131 and include one or more transceivers. The transceiver(s) may include any of modulators, de-modulators, encoders, decoders, encryption modules, decryption modules, amplifiers, and filters. The communication resource(s) 130 may be capable of device-to-device and/or cellular communication with other UAVs, wireless communication devices carried by a user (e.g., a smartphone), a UAV controller, and other devices or electronic systems.

The processor 120 and/or the navigation unit 125 may be configured to communicate through the communication resource(s) 130 with a wireless communication device 170 through a wireless connection (e.g., a cellular data network) to receive assistance data from the server and to provide UAV position information and/or other information to the server.

A bi-directional wireless communication link 132 may be established between transmit/receive antenna 131 of the communication resource(s) 130 and the transmit/receive antenna 171 of the wireless communication device 170. In some embodiments, the wireless communication device 170 and UAV 100 may communicate through an intermediate communication link, such as one or more wireless network nodes or other communication devices. For example, the wireless communication device 170 may be connected to the communication resource(s) 130 of the UAV 100 through a cellular network base station or cell tower. Additionally, the wireless communication device 170 may communicate with the communication resource(s) 130 of the UAV 100 through a local wireless access node (e.g., a Wi-Fi access point) or through a data connection established in a cellular network.

In some embodiments, the communication resource(s) 130 may include a GPS or GNSS receiver (not shown), enabling GNSS signals to be provided to the navigation unit 125. A GPS or GNSS receiver may provide three-dimensional coordinate information to the UAV 100 by processing signals received from three or more GPS or GNSS satellites. GPS and GNSS receivers can provide the UAV 100 with an accurate position in terms of latitude, longitude, and altitude, and by monitoring changes in position over time, the navigation unit 125 can determine direction of travel and speed over the ground as well as a rate of change in altitude. In some embodiments, the navigation unit 125 may use an additional or alternate source of positioning signals other than GNSS or GPS. For example, the navigation unit 125 or one or more communication resource(s) 130 may include one or more radio receivers configured to receive navigation beacons or other signals from radio nodes, such as navigation beacons (e.g., very high frequency (VHF) omnidirectional range (VOR) beacons), Wi-Fi access points, cellular network sites, radio stations, etc. Because UAVs often fly at low altitudes (e.g., below 400 feet), the UAV 100 may scan for local radio signals (e.g., Wi-Fi signals, Bluetooth signals, cellular signals, etc.) associated with transmitters (e.g., beacons, Wi-Fi access points, Bluetooth beacons, small cells (picocells, femtocells, etc.), etc.) having known locations such as beacons or other signal sources within restricted or unrestricted areas near the flight path. The navigation unit 125 may use location information associated with the source of the alternate signals together with additional information (e.g., dead reckoning in combination with last trusted GNSS/GPS location, dead reckoning in combination with a position of the UAV takeoff zone, etc.) for positioning and navigation in some applications. Thus, the UAV 100 may navigate using a combination of navigation techniques, including dead-reckoning, camera-based recognition of the land features below and around the UAV 100 (e.g., recognizing a road, landmarks, highway signage, etc.), etc. that may be used instead of or in combination with GNSS/GPS location determination and triangulation or trilateration based on known locations of detected wireless access points.

In some embodiments, the control unit 110 may include a camera 127 and an imaging system 129. The imaging system 129 may be implemented as part of the processor 120, or may be implemented as a separate processor, such as an application specific integrated circuit (ASIC), a field programmable gate array (FPGA), or other logical circuitry. For example, the imaging system 129 may be implemented as a set of executable instructions stored in the memory unit 121 that execute on the processor 120 coupled to the camera 127. The camera 127 may include sub-components other than image or video capturing sensors, including auto-focusing circuitry, International Organization for Standardization (ISO) adjustment circuitry, and shutter speed adjustment circuitry, etc.

The control unit 110, the navigation unit 125, and/or the avionics component 126 may include at least one sensor 140 coupled to the processor 120, which can supply data to the navigation unit 125 and/or the avionics component 126. For example, the sensor(s) 140 may include an inertial measurement unit (IMU) 141, which may include one or more accelerometers (configured to output a measure of accelerations along three axes), one or more gyroscopes (configured to output a measure of rotations about three axes), one or more magnetometers (configured to output a magnetic compass heading), or any combination thereof. The sensor(s) 140 may also include GPS receivers, barometers, thermometers, audio sensors, airspeed sensors, motion sensors, etc. The IMU 141 may provide navigational information, e.g., via dead reckoning, including at least one of the position, orientation (e.g., pitch, roll and yaw), rotation direction and rate, accelerations, and velocity (e.g., direction and speed of movement) of the UAV 100.

The output of gyroscopes and accelerometers (as well as other sensors) within the IMU 141 may be sensitive to temperature, and thus exhibit a temperature bias. Consequently, the output of the IMU 141 may need to be adjusted for temperature or the IMU 141 may need to be calibrated for temperature, depending upon the data output by the IMU. Similarly, oscillators within communication resources 130 may exhibit temperature sensitivity that may require compensation or calibration.

In some embodiments, the IMU 141 may be thermally coupled to the processor 120. For example, the IMU 141 and the processor 120 may be located on the same circuit board or on the same System on Chip (SoC). Other temperature sensitive units, such as oscillators within communication resources 130, may be similarly thermally coupled to the processor 120.

While the various components of the control unit 110 are illustrated in FIG. 1 as separate components, some or all of the components (e.g., the processor 120, the motor system 123, the communication resource(s) 130, the IMU 141, and other units) may be integrated together in a single device or unit, such as a system-on-chip. The UAV 100 and the control unit 110 may also include other components not illustrated in FIG. 1.

Figure 2:
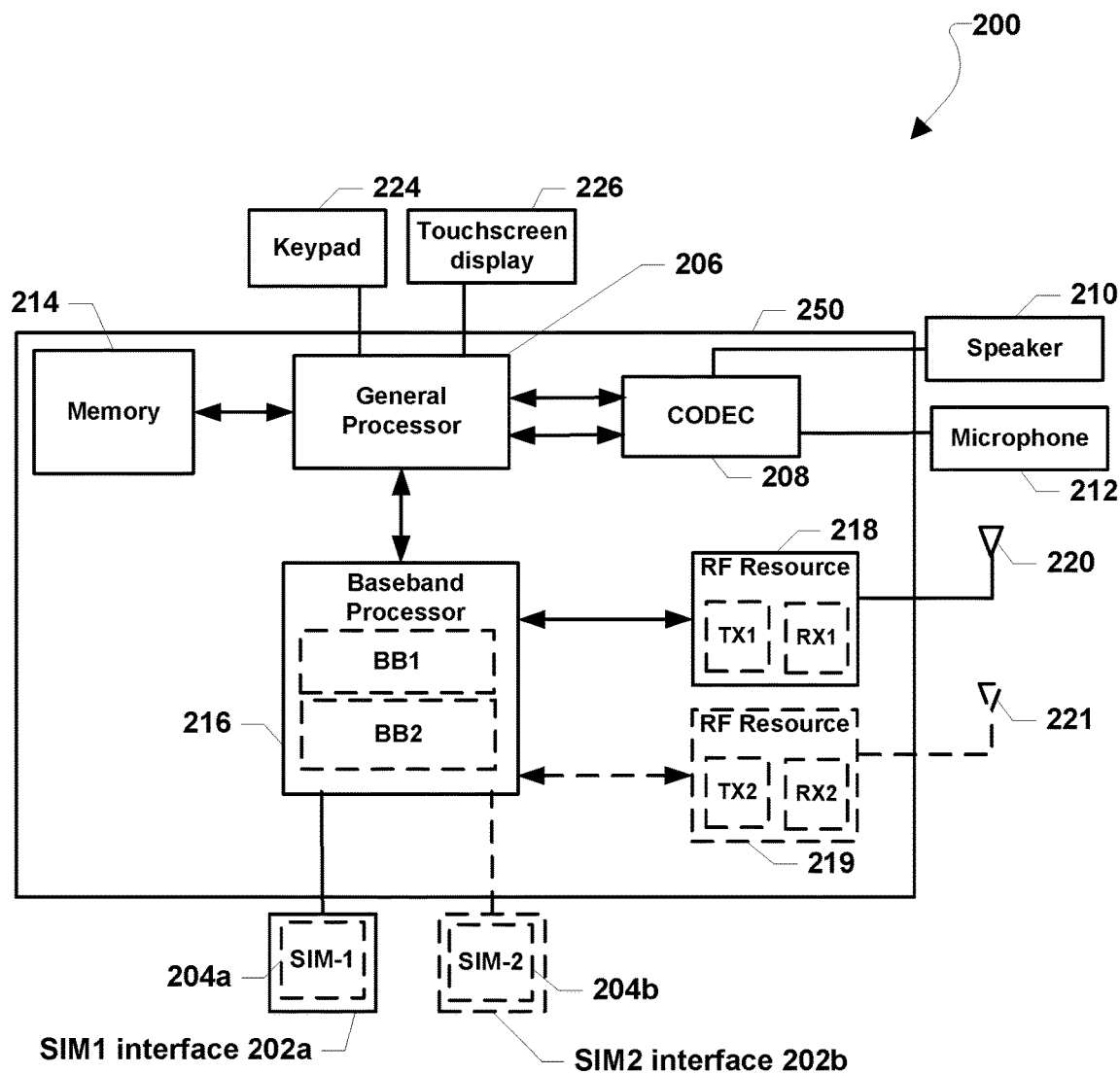
FIG. 2 is a block diagram illustrating components of a mobile communication device suitable for use in various embodiments.

A variety of other electronic devices have temperature-sensitive units, such as oscillators, gyroscopes, and accelerometers. For example, such components are now standard in modern mobile communication device (e.g., smartphones). FIG. 2 is a functional block diagram of a mobile communication device 200 suitable for implementing various embodiments.

With reference to FIGS. 1-2, a mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. For example, the instructions may include routing communication data relating to the first or second subscription though a corresponding baseband-RF resource chain. The memory 214 may store an operating system (OS), as well as user application software and executable instructions.

The general processor 206 and the memory 214 may each be coupled to at least one baseband modem processor 216. A baseband-RF resource chain may include the baseband modem processor 216, which may perform baseband/modem functions for communications with/controlling a RAT, and may include one or more amplifiers and radios, referred to generally herein as RF resources (e.g., RF resource 218, 219). In some examples, baseband-RF resource chains may share the baseband modem processor 216 (i.e., a single device that performs baseband/modem functions for all RATs on the mobile communication device 200). In other examples, each baseband-RF resource chain may include physically or logically separate baseband processors (e.g., BB1, BB2).

A mobile communication device 200 may include one or more subscriber identity module (SIM), which may contain user account information, an international mobile subscriber identity (IMSI), a set of SIM application toolkit (SAT) commands, and storage space for phone book contacts. The mobile communication device 200 may include a first SIM interface 202a, which may receive a first identity module SIM-1 204a that is associated with a first subscription. The mobile communication device 200 may also optionally include a second SIM interface 202b, which may receive an optional second identity module SIM-2 204b that is associated with a second subscription. Each SIM in the mobile communication device 200 (e.g., the SIM-1 204a and/or the SIM-2 204b) may be associated with a baseband-RF resource chain.

The SIMs 204a, 204b may enable users to access multiple separate mobile telephony networks which may employ different mobile telephony network technologies. Examples of mobile telephony network technologies, referred to as radio access technologies (RATs), include Third Generation (3G), Fourth Generation (4G), Long Term Evolution (LTE), Time Division Multiple Access (TDMA), Frequency Division Multiple Access (FDMA), Code Division Multiple Access (CDMA), Wideband CDMA (WCDMA), Time Division Synchronous CDMA (TD-SCDMA), Global System for Mobile Communications (GSM), Universal Mobile Telecommunications Systems (UMTS), evolved High Speed Packet Access (HSPA+), Dual-Cell High Speed Packet Access (DC-HSPA), Evolution Data-Optimized (EV-DO), Enhanced Data rates for GSM Evolution (EDGE), and single carrier Radio Transmission Technologies (1×RTT).

The RF resource 218 may be a transceiver that performs transmit/receive functions for each of the SIMs/RATs on the mobile communication device 200. The RF resource 218 may include separate transmit and receive circuitry, or may include a transceiver that combines transmitter and receiver functions. In some examples, the RF resource 218 may include multiple receive circuitries. The RF resource 218 may be coupled to a wireless antenna (e.g., a wireless antenna 220). The RF resource 218 may also be coupled to the baseband modem processor 216. In some optional examples, the mobile communication device 200 may include an optional RF resource 219 configured similarly to the RF resource 218 and coupled to an optional wireless antenna 221.

The RF resources 218, 219, or components with the RF resources (e.g., oscillators) may be temperature sensitive and may be thermally coupled to the processor 206. For example, the processor 206 and the RF resources 218, 219 may be located on the same circuit board. The mobile communication device 200 may also contain other temperature sensitive units that are thermally coupled to the processor 206 (e.g., power amplifiers). For example, the general processor 206, the memory 214, the baseband processor(s) 216, and the RF resources 218, 219 may be included in the mobile communication device 200 as a system-on-chip 250.

A mobile communication device 200 may further include various input and output devices coupled to components on the system-on-chip 250, such as interfaces or controllers. Example user input components suitable for use in the mobile communication device 200 may include, but are not limited to, a keypad 224, a touchscreen display 226, and the microphone 212.

Temperature sensitive units, such as the IMU 141 in a UAV 100 or RF resources 218, 219 in a mobile communication device 200, may exhibit a temperature bias that affects the output of the unit. The temperature of such temperature sensitive units may be affected by other components in electronic devices that generate heat, and may also be affected by the ambient temperature. Modern electronic devices are designed to operate within a larger temperature range to accommodate a range of ambient conditions and a range of operating demands and applications. To function across the design temperature range, temperature sensitive units may be calibrated in the factory to determine their temperature bias and to apply an appropriate correction. Temperature calibration usually involves heating the temperature sensitive unit using specialized equipment (e.g., an oven or internal heating elements) to target temperatures across a range of temperatures while determining the temperature bias on the output. The temperature bias may be extrapolated over the entire operating temperature range. However, this process is time-consuming and may require a lot of additional equipment.

In various embodiments, processing components in electronic devices may be used to adjust the temperature of temperature sensitive units for conducting temperature calibration procedures. In particular, components that have another primary use may be utilized to raise the temperature of temperature sensitive units to a target temperature by performing operations that generate heat, and continue to perform operations at a rate sufficient to hold the target temperature long enough to perform a temperature calibration procedure.

Figure 3A:
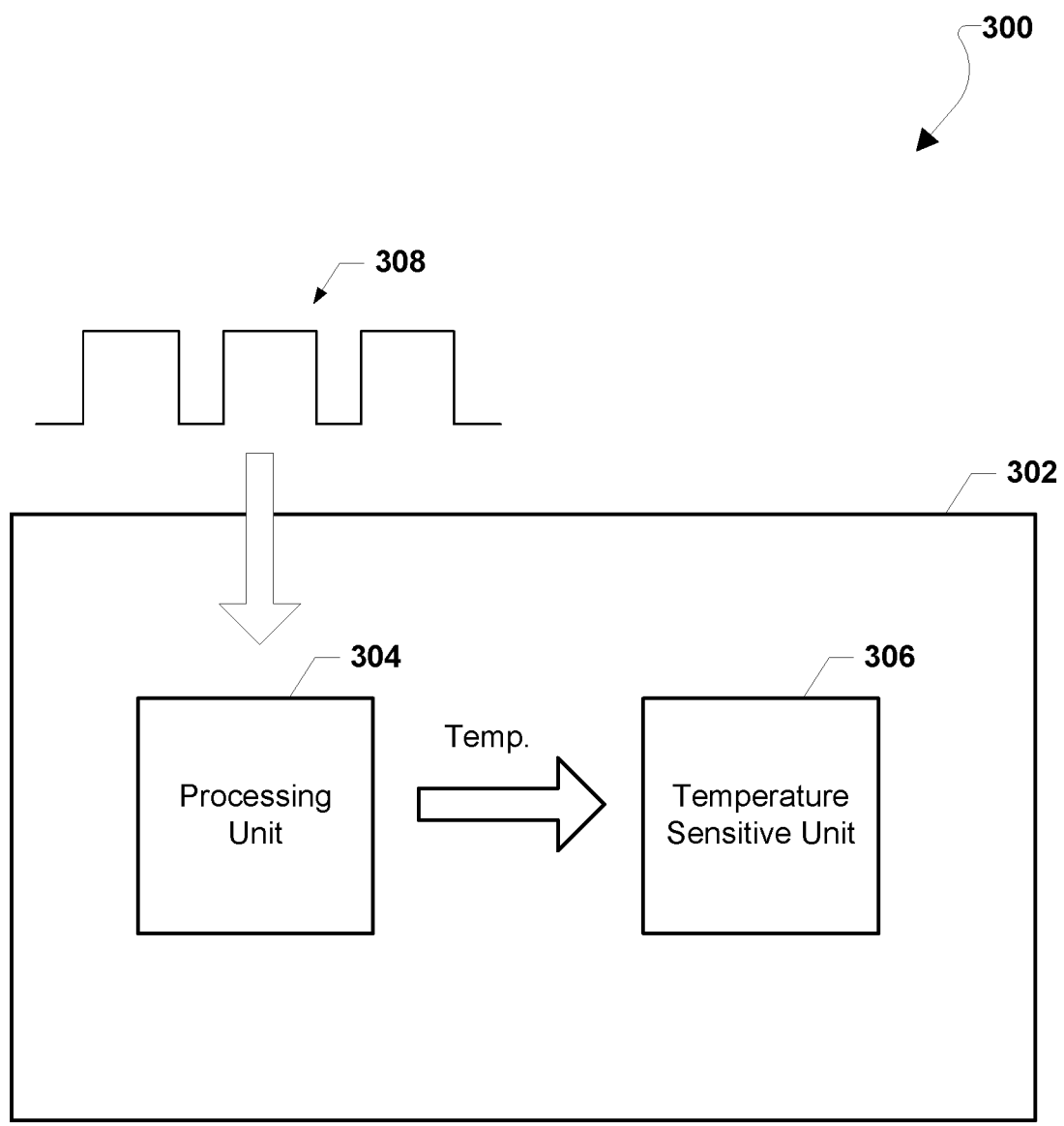
FIGS. 3A and 3B are a block diagrams illustrating the use of a processing unit to perform temperature calibration according to various embodiments.

FIG. 3A includes a diagram 300 illustrating the use of a processing unit 304 to calibrate a temperature sensitive unit 306. With reference to FIGS. 1-3A, the processing unit 304 and the temperature sensitive unit 306 may be located within an electronic device, such as a UAV (e.g., the UAV 100), a mobile communication device (e.g., the mobile communication device 200), or any other electronic device.

The temperature sensitive unit 306 may be an IMU (e.g., the IMU 141), an RF resource (e.g., the RF resources 218, 219), an oscillator, a power amplifier, or any other electronic component that exhibits a temperature bias. The processing unit 304 may be a central processing unit, graphics processor unit, a digital signal processor, a power amplifier, an encoder, a decoder, or any other processing unit that executes software instructions. For example, the processing unit may be the processor 120 in the UAV 100 or the processor 206 in the mobile communication device 200.

In various embodiments, the processing unit 304 performs operations that have a load level sufficient to generate heat that will raise the temperature sensitive unit 306 to a target temperature given the ambient conditions. The target temperature may be, for example, the maximum operating temperature of the temperature sensitive unit 306. The higher the processing load applied to the processing unit 304, the greater the amount of heat that is generated, raising the temperature of nearby complements. The processing unit 304 may be thermally coupled to the temperature sensitive unit 306, or may simply raise the internal temperature of the electronic device, thereby increase the temperature of the temperature sensitive unit 306. For example, the processing unit 304 and the temperature sensitive unit 306 may be located on a circuit board 302 that conducts heat.

As the temperature of the temperature sensitive unit 306 will depend upon ambient conditions (i.e., the exterior temperature of the electronic device) as well as the heat generated by internal compliments, including the processing unit 304, the various embodiments include adjusting the processing load of the processing unit 304 in response to a measured temperature of the temperature sensitive unit 306 or nearby complements. The load of the thread may be varied in order to vary the amount of heat generated so that the temperature of the temperature sensitive unit 306 rises to a target temperature for calibration. This may be accomplished in a feedback mechanism in which the processing load on the processing unit 304 is increased when the measured temperature of the temperature sensitive unit 306 (or a nearby temperature sensor) is below the target temperature, and decreased when the measured temperature of the temperature sensitive unit 306 (or nearby temperature sensor) is above the target temperature. Thus, the temperature of the temperature sensitive unit 306 (or nearby temperature sensor) may be controlled by varying the processing load on the processing unit 304 regardless of the ambient temperatures of the electronic device.

When the target temperature of the temperature sensitive unit 306 is achieved, the processing load on the processing unit 304 may be held steady to maintain a constant temperature for the duration of conducting a temperature calibration procedure. For temperature calibration procedures spanning a range of temperatures, the processing load on the processor unit 304 may be ramped up at a rate that achieves a target rate of temperature increase to a maximum, and then ramped down at a rate that achieves a target rate of temperature decrease during the procedure.

In some embodiments, the load on the processing unit or units may be maximized without variation in an open loop manner, such as raising the temperature of the electronic device to as high a temperature as can be achieved under ambient conditions using only the processing unit or units.

The processing load imposed on the processing unit 304 within the electronic device may be in the form of a thread that is executed on the processing unit 304. During a temperature calibration procedure, the load on the processing unit 304 caused by execution of the thread may be adjusted as a linear function of both the target temperature that the temperature sensitive unit 306 should be heated to (i.e., a feed forward term), and the difference between the target temperature and the current temperature of the temperature sensitive unit 306 (i.e., a proportional term).

In some embodiments, the load on the processing unit 304 caused by execution of the thread may be controlled by adjusting a duty cycle of the thread, such as by executing the thread based on a clock cycle 308 of the processing unit 304. For example, the thread may run a WHILE loop during the ON duration of the clock cycle 308 and sleep during the OFF duration of the clock cycle 308. While the thread is running the WHILE loop, the processing unit 304 and the temperature sensitive unit 306 may heat up. While the thread is sleeping, the processing unit 304 and the temperature sensitive unit 306 may cool down. In other embodiments, different instructions may be executed during the ON and OFF cycles of the clock cycle 308. For example, the thread may execute arithmetic logic unit (ALU) instructions during the ON duration of the clock cycle 308 and memory transfer instructions during the OFF duration of the clock cycle 308.

The period of the clock cycle 308, and thus the duty cycle of the thread, may be varied in order to reach a target temperature. For example, a longer clock period (higher duty cycle) may be used so that the processing unit 304 executes the thread for more time, causing the temperature sensitive unit 306 to heat up. Conversely, the clock period be shortened reducing the duty cycle) so that the processing unit 304 generates less heat, causing the temperature sensitive unit 306 to cool down as heat is lost to the exterior of the electronic device. Other components may also be used to aid in heating or cooling the temperature sensitive unit 306, such as a fan or additional processing units that may be thermally coupled to the temperature sensitive unit 306.

In some embodiments, different instructions may be executed in response to measured temperatures to control the amount of heat generated by the processing unit 304 in order to achieve a desired temperature. For example, a thread executed in the processing unit 304 may include extra arithmetic logic unit (ALU) instructions to generate more heat when the measured temperature is below a target temperature, while the processing unit 304 performs normal operations and/or memory transfer instructions that generate less heat when the measured temperature is at or above the target temperature. In other words, the types of instructions executing in the processing unit 304 may be adjusted, such as by executing additional or operationally-demanding instructions (e.g., ALU instructions) beyond the current processing load in order to raise the operating temperature within the electronic device and/or of the temperature sensitive unit 306.

As the thread is executing in the processing unit 304 according to the clock cycle 308, the temperature of the temperature sensitive unit 306 may be measured by a temperature sensor. For example, the temperature sensitive unit 306 may include a thermistor that provides a measure of the temperature of the temperature sensitive unit 306 in the form of a change in resistance. The output of the temperature sensor (i.e., a measure of the temperature of the temperature sensitive unit 306) may be compared to a target output corresponding to the target temperature for conducting the temperature calibration procedure, and the clock cycle 308 adjusted accordingly.

To conduct a temperature calibration procedure, the output of the temperature sensitive unit 306 while operating at the target temperature may be compared to a standard or target value in order to calculate or measure the effects (e.g., a temperature bias) of temperature on the performance or output of the temperature sensitive unit 306. This measured or calculated temperature bias may be used to correct the output of the temperature sensitive unit 306 or otherwise compensate for the temperature bias during normal operations. In some embodiments, the temperature calibration may be performed for a plurality of target temperatures or during a preprogrammed temperature profile (i.e., temperature versus time profile).

In some embodiments, the processing unit 304 may also be used to heat the temperature sensitive unit 306 during run time of the electronic device. For example, it may be beneficial to heat the temperature sensitive unit 306 for better performance when the electronic device is operating in cold weather. During idle cycles of the processing unit 304, the processing unit 304 may execute a thread with a load in order to heat the temperature sensitive unit 306 to a desired temperature or temperature range. In some instances, such as very cold ambient conditions, the load on the processing unit or units may be maximized without variation (not shown) for open loop heating to raise the temperature of the electronic device to as high a temperature as can be achieved under the ambient conditions.

Figure 3B:
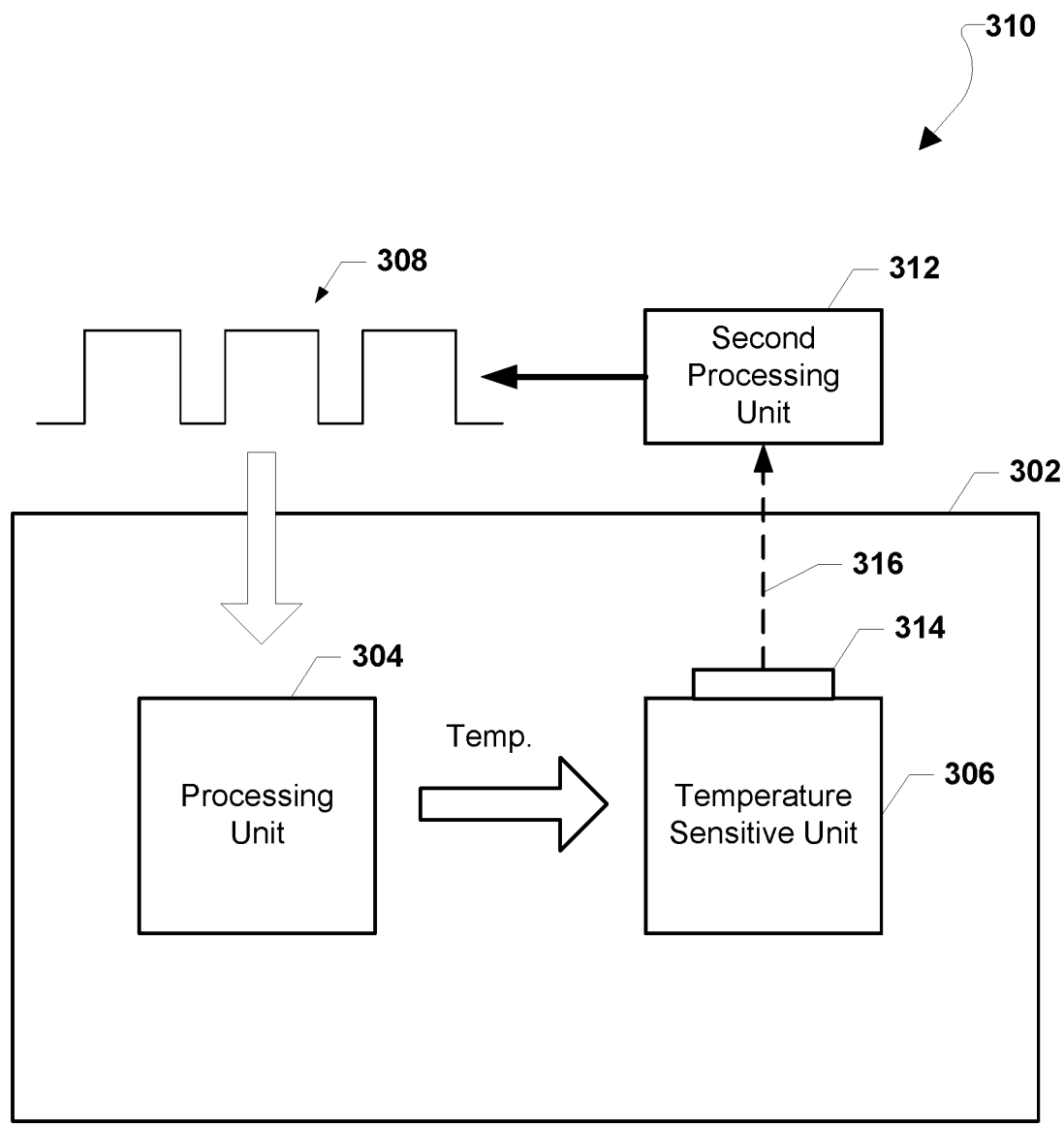

FIG. 3B includes a diagram 310 illustrating the use of a first processing unit 304 controlled by a second processing unit 312 to calibrate a temperature sensitive unit 306. With reference to FIGS. 1-3B, the first processing unit 304, the second processing unit 312, and the temperature sensitive unit 306 may be located within an electronic device, such as a UAV (e.g., the UAV 100), a mobile communication device (e.g., the mobile communication device 200), or any other electronic device. In some embodiments, the second processing unit in the electronic device may determine the processing load that should be executed on the first processing unit 304 to heat the temperature sensitive unit 306. For example, in a UAV 100 configuration, IMU (e.g., 141) may be the temperature sensitive unit 306 and a processing unit that is thermally coupled to an IMU 141 may be (or include) a processor within the avionics unit 126. In this example, the avionics unit processor (i.e., within 126) may be considered the "first processing unit" 304 and a general processor (e.g., 120) may be the "second processing unit" 312 for purposes of this description. In another example, in a mobile communication device 200 an oscillator within the RF resource 218 may be the temperature sensitive unit 306 and the processor thermally coupled to the oscillator may be a modem processor or baseband processor (e.g., 216) (e.g., when the RF resource and modem components are positioned on the same chip). In this example, the modem or baseband processor (216) may be considered the "first processing unit" 304 and a general processor (e.g., 206) may be the "second processing unit" 312 for purposes of this description. In a further example (not shown), the general processing unit may be a multi-processor unit (e.g., a quad-core processor) in which a first processing core closest to a temperature sensitive unit 306 is the "first processing unit" 304 and another (i.e., second) processing core functions as the "second processing unit" 306 controlling the processing load on the first processing core so as to heat the temperature sensitive unit 306. In such embodiments, the second processing unit 312 may measure the current temperature of the temperature sensitive unit 306, such as by receiving signals 316 from a temperature sensor 314 (e.g., a thermistor) thermally coupled to the temperature sensitive unit 306. The second processing unit 312 may determine a load 308 (e.g., a thread or types of instructions and/or a duty cycle for the thread or instructions) to execute on the processing unit 304 based on the measured temperature and a target temperature. The second processing unit 312 may then control the processing unit 304 by directing it to execute the thread/instructions 308 to achieve the determined load to raise or lower the temperature of the temperature sensitive unit 306.

In some embodiments, the processing unit 304 may be used to calibrate more than one temperature sensitive unit. For example, the processing unit 304 or 312 may measure the current temperature of a plurality of temperature sensitive units including the temperature sensitive unit 306, and execute a load on the processing unit 304 that is based on the current temperatures of each of the plurality of temperature sensitive units and a target temperature for each temperature sensitive unit. For example, the load may be based on the average current temperature of the plurality of temperature sensitive units and the average difference between the target temperature and the current temperature of each of the plurality of temperature sensitive units.

In some embodiments, multiple processing units (e.g., multiple processing cores in a multi-core processor, or different types of processors, e.g., a digital signal processor, a graphics processor, etc.) may be used to heat the temperature sensitive unit 306. For example, if multiple processing units are located in different locations relative to the temperature sensitive unit 306, using multiple processing units to control temperature may enable a faster and/or more even temperature increase of the temperature sensitive unit 306. In some embodiments, one processing unit, such as the second processing unit 312, may control the load executed on each of the plurality of processing units 304 based on the current temperature of the temperature sensitive unit 306 and a target temperature. For example, the load may be evenly distributed across all of the processing units thermally coupled to the temperature sensitive unit 306, or may be based on the distance from the temperature sensitive unit 306 and each processing unit 304, or may be based on the thermal coupling efficiency between the temperature sensitive unit 306 and each processing unit 304.

In some embodiments, the processing unit 304 or 312 may also perform temperature-based performance testing on the temperature sensitive unit 306. For example, the processing unit 304 may heat the temperature sensitive unit 306 to one or more target temperatures. At each target temperature, the processing unit 304 or 312 may compensate for bias in the output of the temperature sensitive unit 306 based on its temperature bias (determined during calibration as described herein). The processing unit 304 or 312 may then determine the performance of the temperature sensitive unit 306. For example, the processing unit 304 or 312 may compare the compensated output of the temperature sensitive unit 306 with its expected output at the target temperature. The processing unit 304 or 312 may also determine other performance metrics of the temperature sensitive unit 306.

Figure 4A:
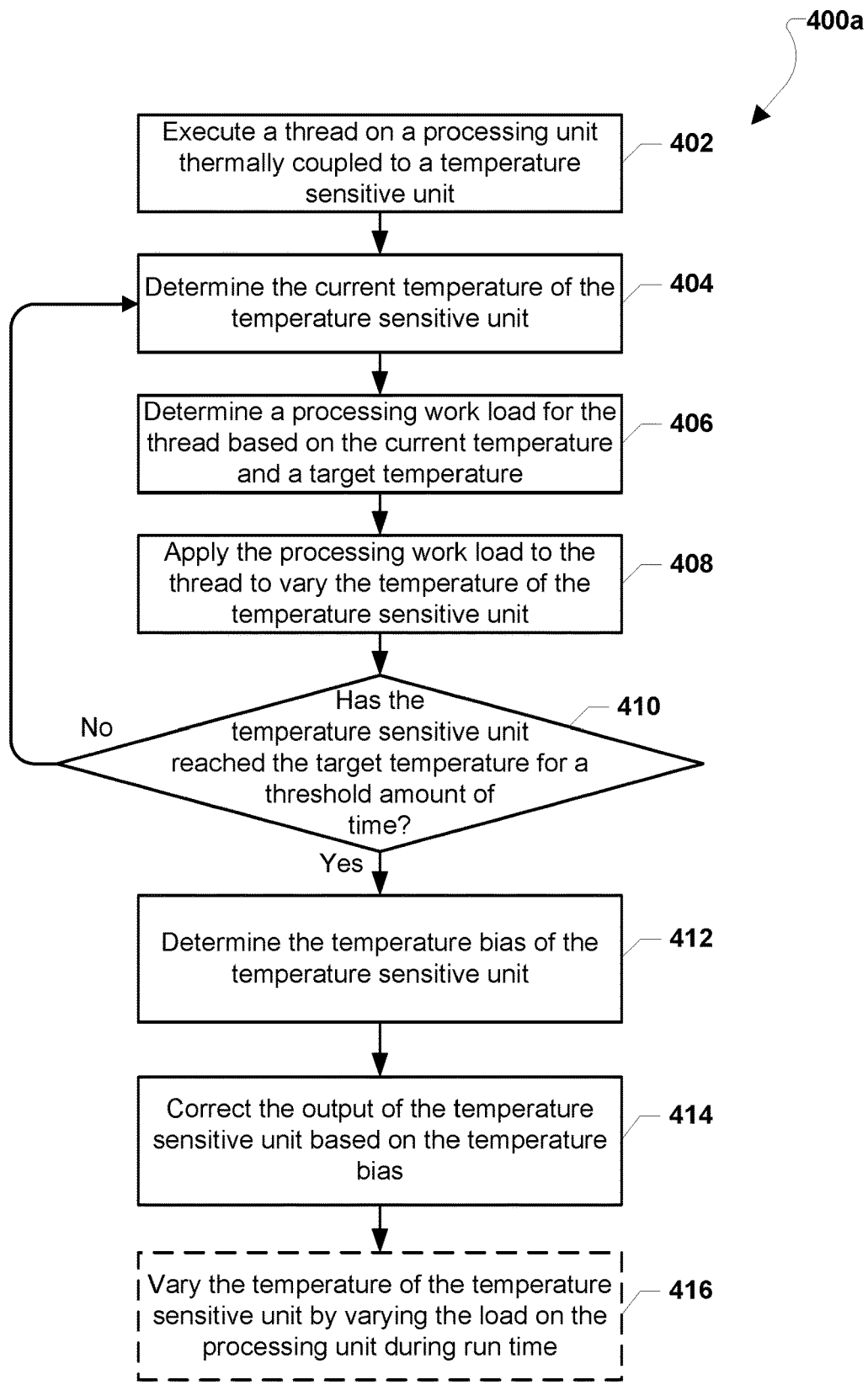
FIGS. 4A-4B are process flow diagrams illustrating methods for performing temperature calibration on an electronic device according to various embodiments.
Figure 4B:
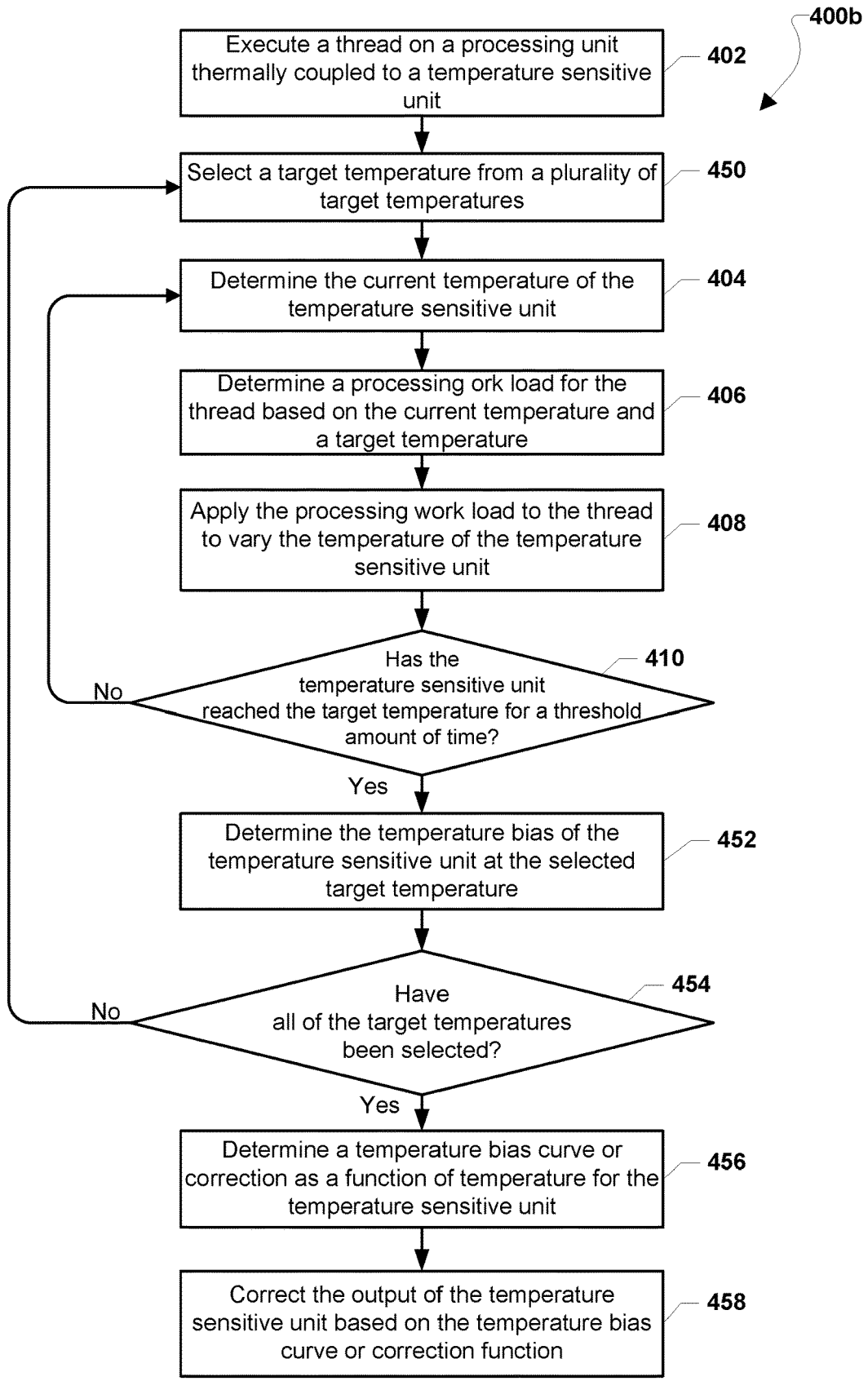

FIGS. 4A-4B illustrate methods 400a and 400b for performing temperature calibration on an electronic device according to various embodiments. With reference to FIGS. 1-4B, the operations of the methods 400a and 400b may be performed by one or more processing units (e.g., the processor 120, the processor 206, or the processing unit 304, 312) in an electronic device. The electronic device may be, for example, a UAV or a mobile communication device. The processing unit(s) may include, but are not limited to, central processing units, graphics processing units, digital signal processors, power amplifiers, encoders, and decoders. The processing unit may be thermally coupled to a temperature sensitive unit through, for example, a circuit board. The electronic device also includes one or more temperature sensitive units, such as IMUs, RF resources, oscillators, power amplifiers, or any other component that exhibits a temperature bias.

In block 402 of the method 400a, a processing unit on the electronic device may execute a thread. For example, a temperature calibration application on the electronic device may execute the thread on the processing unit. The thread may be a dummy thread used to introduce a load on the processing unit and cause the processing unit to heat up. Processing of the thread in the processing unit generates heat that increases the temperature of the temperature sensitive unit that is thermally coupled to the processing unit. For example, the thread may include dummy instructions (e.g., WHILE loops) that causes the processing unit to execute commands that generate heat. As discussed above, in some embodiments, the thread may be executed according to a duty cycle that may be varied in order to adjust the amount of heat is generated by the processing unit.

In block 404, the processing unit may determine the current temperature of the temperature sensitive unit. This may be accomplished by receiving or accessing an output of a temperature sensor (e.g., a thermistor) located on or near the temperature sensitive unit. In various embodiments, determining the current temperature of the temperature sensitive unit in block 404 may be performed before, during or after executing the thread on the processing unit in block 402.

In block 406, the processing unit may determine or estimate a processing load or duty cycle for the thread necessary to achieve a target temperature based on a difference between the current (i.e., measured) temperature of the temperature sensitive unit and a target temperature, as well as a current processing load. The target temperature may be a temperature at which temperature calibration is performed, which may be the maximum operating temperature of the temperature sensitive unit or another temperature suitable for collecting data for determining a temperature bias. The load or duty cycle for the thread may be proportional to the target temperature (i.e., a feed-forward term) and the difference between the target temperature and the current temperature (i.e., a proportional term).

In block 408, the processing unit may apply the determined load or duty cycle to the thread to vary the amount of heat generated by the processing unit, and thus vary the temperature of the temperature sensitive unit. The temperature calibration application may configure the thread to execute one set of dummy instructions (e.g., WHILE loops, ALU instructions, etc.) during the ON duration of the clock cycle and another set of dummy instructions (e.g., memory transfers) or sleep during the OFF duration of the clock cycle. The dummy instructions executed during the ON duration of the clock cycle cause the processing unit to generate heat, which also causes the temperature sensitive unit to heat up. When the processing unit sleeps or executes another set of dummy instructions during the OFF duration of the clock cycle, the processing unit and the temperature sensitive unit cool down due to heat dissipation. The dummy instructions executed during the OFF duration may generate less heat than the dummy instructions executed during the ON duration. Alternatively, the types of instructions that are executed in addition to the current operating load may be controlled to generate heat at a rate that enables achieving the target temperature for the temperature sensitive unit. Thus, the load may be adjusted by controlling the duty cycle of or types of instructions within the thread executing on the processing unit to control the amount of heat generated by the processing unit.

In determination block 410, the processing unit may determine whether the temperature sensitive unit has reached the target temperature for a threshold amount of time. The threshold amount of time may be selected so that the temperature sensitive unit operates in a steady state at the target temperature long enough to determine the temperature effects on performance or output (e.g., a temperature bias) of the unit. In some implementations, the amount of time (or threshold) may a minimum time required for the temperature sensitive unit to uniformly reach the target temperature. In some implementations, the amount of time (or threshold) may be a minimum time required for the temperature sensitive unit to uniformly reach the target temperature plus a duration at that temperature required by the calibration procedure.

In response to determining that the temperature sensitive unit has not reached the target temperature or has not been at the target temperature for a threshold amount of time (i.e., determination block 410="No"), the processing unit may re-determine the current temperature of the temperature sensitive unit in block 404, re-determine the load (or duty cycle) for the thread based on the measured temperature in block 406, and apply the determined load (or duty cycle) for the thread in block 408. In other words, the processing unit may continue to operate at a processing load sufficient to heat the temperature sensitive unit to the target temperature as determined in a temperature feedback control mechanism based on the target temperature and the measured current temperature.

In response to determining that the temperature sensitive unit has reached the target temperature for the threshold amount of time (i.e., determination block 410="Yes"), the processing unit may determine or measure the temperature effects on performance or output (e.g., a temperature bias) of the temperature sensitive unit in block 412. For example, the temperature calibration application may determine or measure the temperature effects on performance or output (e.g., a temperature bias) by determining the relationship between the output of the temperature sensitive unit and the temperature of the temperature sensitive unit. In some embodiments, this may be accomplished by calculating the difference between an output of the temperature sensitive unit and a standard or calibration value.

In block 414, the processing unit may correct the output of the temperature sensitive unit during run time of the electronic device based on the calculated or measured temperature bias and the current temperature of the temperature sensitive unit. Specifically, the processing unit may reduce or increase the value of the output of the temperature sensitive unit based on the current temperature of the temperature sensitive unit and the determined temperature bias. For example, the processing unit may use the current temperature of the temperature sensitive unit as a look up value in a determined temperature bias curve to obtain an adjustment (increase or decrease) to apply to the value of the output of the temperature sensitive unit. As another example, the processing unit may use the current temperature of the temperature sensitive unit as input to a temperature bias function curve for obtaining an adjustment (increase or decrease) to apply to the value of the output of the temperature sensitive unit.

In optional block 416, the processing unit may vary the temperature of the temperature sensitive unit by varying the load on the processing unit during run time. For example, there may be a preferred or optimal temperature range for the temperature sensitive unit. The processing unit may utilize idle clock cycles during run time to execute a dummy thread and increase a duty cycle of the dummy thread executing on the processing unit so as to heat the temperature sensitive unit or to keep the temperature sensitive unit at a steady temperature or within a temperature range. In this manner, the method 400a provides a way to use pre-existing components in an electronic device to conduct temperature calibration of a temperature sensitive unit in the electronic device.

The method 400b is similar to the method 400a except that the temperature sensitive unit is heated to a plurality of target temperatures by varying the processing load imposed on the processing unit during a temperature calibration procedure.

In block 402, the processing unit may execute a thread on a processing unit that is coupled to the temperature sensitive unit.

In block 450, the processing unit may select a target temperature from a plurality of target temperatures. Conducting temperature calibration over a plurality of target temperatures may be performed to determine or measure a nonlinear temperature bias.

As described for like number blocks of the method 400a, the processing unit may determine the current temperature of the temperature sensitive unit in block 404, determine a load or duty cycle for the thread based on the current temperature of the temperature sensitive unit and a target temperature in block 406, and apply the determined load or duty cycle in block 408 to increase or decrease the temperature of the temperature sensitive unit toward the target temperature determined in block 450.

In determination block 410, the processing unit may determine whether the temperature sensitive unit has reached the target temperature for a threshold amount of time.

In response to determining that the temperature sensitive unit has not reached the selected target temperature or has not been maintained at the selected target temperature for a threshold amount of time (i.e., determination block 410="No"), the processing unit may re-determine the current temperature of the temperature sensitive unit in block 404, re-determine the load or duty cycle for the thread in block 406, and apply the determined load or duty cycle in block 408.

In response to determining that the temperature sensitive unit has reached the target temperature for the threshold amount of time (i.e., determination block 410="Yes"), the processing unit may determine or measure the temperature effects on performance or output (e.g., a temperature bias) of the temperature sensitive unit at the selected temperature in block 452. This determination or measurement may be accomplished similar to the operations in block 412 of the method 400*a*.

In determination block 454, the processing unit may determine whether all of the plurality of target temperatures have been selected. In response to determining that not all of the plurality of target temperatures have been selected (i.e., determination block 454="No"), the processing unit may select another target temperature in block 450. In other words, the processing unit repeats the temperature calibration with another target temperature.

In response to determining that all of the plurality of target temperatures have been selected (i.e., determination block 454="Yes"), the processing unit may determine a temperature bias curve or correction factor as a function of temperature for the temperature sensitive unit in block 456. This temperature bias curve or correction factor that is a function of temperature may be determined using all of the temperature biases determined in block 452. For example, the processing unit may determine or measure the temperature effects on performance or output (e.g., a temperature bias) of the temperature sensitive unit from data collected at each target temperature, and fit the measurements to a function or curve using a mathematical data fitting technique, such as a least-square fit. In some cases, the resulting temperature bias curve may be a linear function, in which case measuring the temperature bias over a range of temperatures and averaging the results through a least squares linear fit yield a more accurate determination of the temperature bias than may be accomplished through a single calibration as in the method 400*a*. In some cases, a temperature sensitive unit may exhibit a nonlinear response to temperature, in which case a nonlinear function or curve may be determined through a quadratic or higher order the squares fit. Also, determining the temperature bias curb or function over a range of temperatures may yield a better estimate of the relationship between temperature and the output of a temperature sensitive unit over the entire operating temperature range.

In block 458, the processing unit may correct the output of the temperature sensitive unit during run time of the electronic device based on the determined temperature bias curve or temperature correction function determined in block 456.

In summary, the operations of blocks 402 through 452 may be repeated with the workload imposed on the processing unit adjusted in each iteration so that a temperature bias of the temperature sensitive unit can be measured at a plurality of target temperatures. In this manner, the method 400*b* provides a way to use pre-existing components (e.g., any of a variety of processors or processor units) in an electronic device to conduct temperature calibration of a temperature sensitive unit across a range of operating temperatures.

In some embodiments, only the operations of determining a processing workload for a thread to executing on the processing unit in block 406 and executing the processing work load for the thread in the processing unit in block 408 may be performed in order to generate heat in an open loop manner so as to heat the electronic device to a maximum temperature achievable under the ambient conditions without use of dedicated heating units.

In some embodiments, the rate at which temperatures are raised and lowered during the calibration procedure may be controlled by varying the threshold amount of time considered in determination block 410. In other words, the rate of increase in temperature of the temperature sensitive unit during a temperature calibration procedure may be controlled by adjusting the threshold amount of time at which the temperature sensitive unit is held at selected target temperatures, as determined in determination block 410, before determining the temperature bias for the temperature sensitive unit at the selected target temperature in block 452.

Figure 4C:
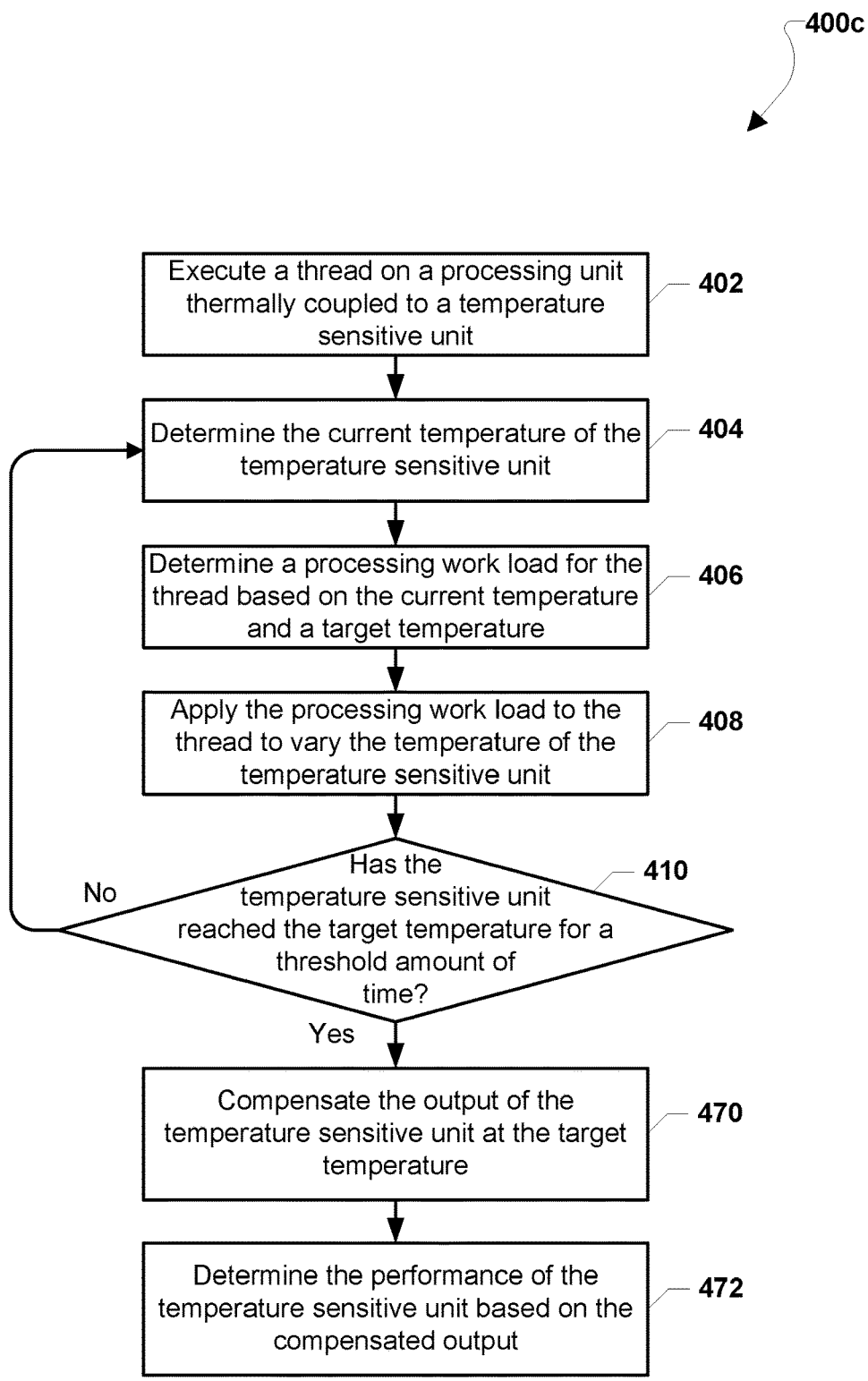
FIGS. 4C-4D are process flow diagrams illustrating methods for determining temperature-dependent performance of an electronic device according to various embodiments.
Figure 4D:
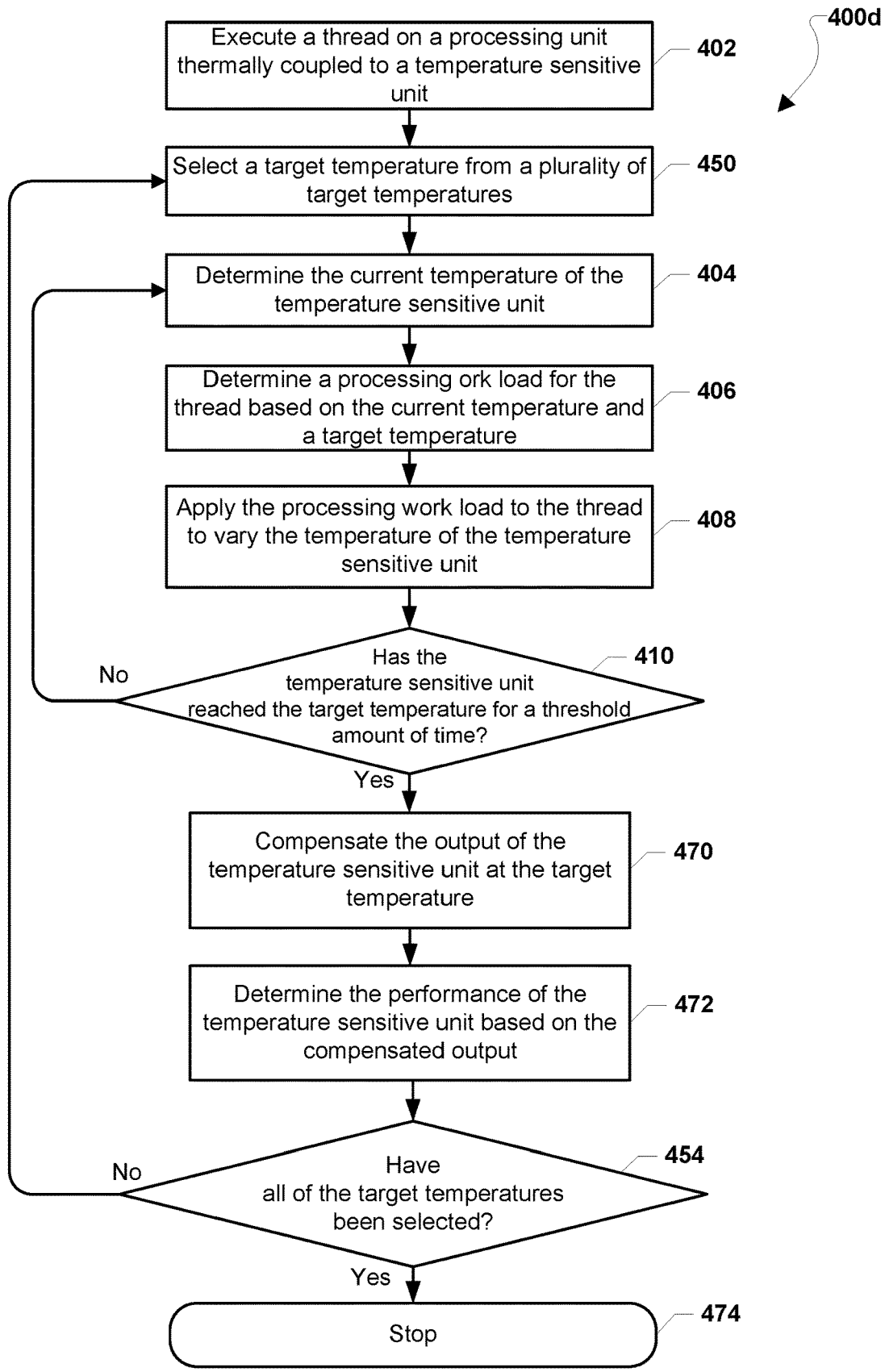

FIGS. 4C-4D illustrate methods 400*c* and 400*d* for determining temperature-based performance of an electronic device according to various embodiments. With reference to FIGS. 1-4D, the operations of the methods 400*c* and 400*d* may be performed by one or more processing units in an electronic device (e.g., the processor 120, the processor 206, or the processing unit 304, 312). The electronic device may be, for example, a UAV or a mobile communication device. The processing unit(s) may include, but are not limited to, central processing units, graphics processing units, digital signal processors, power amplifiers, encoders, and decoders. The processing unit may be thermally coupled to a temperature sensitive unit through, for example, a circuit board. The electronic device also includes one or more temperature sensitive units, such as IMUs, RF resources, oscillators, power amplifiers, or any other component that exhibits a temperature bias.

The method 400*c* may be similar to the method 400*a*, except that instead of performing temperature calibration, the processing unit may conduct temperature-based performance testing. As described for like number blocks of the method 400*a*, in block 402 of the method 400*c* a processing unit on the electronic device may execute a thread. In block 404, the processing unit may determine the current temperature of the temperature sensitive unit. In block 406, the processing unit may determine or estimate a processing load or duty cycle for the thread necessary to achieve a target temperature based on a difference between the current (i.e., measured) temperature of the temperature sensitive unit and a target temperature, as well as a current processing load. In block 408, the processing unit may apply the determined load or duty cycle to the thread to vary the amount of heat generated by the processing unit, and thus varying the temperature of the temperature sensitive unit.

In determination block 410, the processing unit may determine whether the temperature sensitive unit has reached the target temperature for a threshold amount of time. In response to determining that the temperature sensitive unit has not reached the target temperature or has not been at the target temperature for a threshold amount of time (i.e., determination block 410="No"), the processing unit may re-determine the current temperature of the temperature sensitive unit in block 404, re-determine the load (or duty cycle) for the thread based on the measured temperature in block 406, and apply the determined load (or duty cycle) for the thread in block 408.

In response to determining that the temperature sensitive unit has reached the target temperature for the threshold amount of time (i.e., determination block 410="Yes"), the processing unit may compensate an output of the first temperature sensitive unit at the target temperature in block 470. For example, the processing unit may utilize the temperature bias of the temperature sensitive unit (as determined in the methods 400a, 400b) to compensate the output of the temperature sensitive unit.

In block 472, the processing unit may determine the performance of the temperature sensitive unit based on the compensated output. Evaluating the performance may include, for example, determining whether the compensated output matches an expected output of the temperature sensitive unit at the target temperature, or over a range of temperatures. The processing unit may also evaluate other performance metrics of the temperature sensitive unit, such as the speed at which the temperature sensitive unit operates at the target temperature.

Similarly, the method 400d may be similar to the method 400b, except that instead of performing temperature calibration the processing unit may conduct temperature-based performance testing. For example, in block 402 of the method 400d, the processing unit may execute a thread on a processing unit that is coupled to the temperature sensitive unit. In block 450, the processing unit may select a target temperature from a plurality of target temperatures. Conducting performance testing over a plurality of target temperatures may be useful to attest for nonlinear temperature bias.

As described for like number blocks of the method 400a and 400b, the processing unit may determine the current temperature of the temperature sensitive unit in block 404, determine a load or duty cycle for the thread based on the current temperature of the temperature sensitive unit and a target temperature in block 406, and apply the determined load or duty cycle in block 408 to increase or decrease the temperature of the temperature sensitive unit toward the target temperature determined in block 450.

In determination block 410, the processing unit may determine whether the temperature sensitive unit has reached the target temperature for a threshold amount of time.

In response to determining that the temperature sensitive unit has not reached the selected target temperature or has not been maintained at the selected target temperature for a threshold amount of time (i.e., determination block 410="No"), the processing unit may re-determine the current temperature of the temperature sensitive unit in block 404, re-determine the load or duty cycle for the thread in block 406, and apply the determined load or duty cycle in block 408.

In response to determining that the temperature sensitive unit has reached the target temperature for the threshold amount of time (i.e., determination block 410="Yes"), the processing unit may compensate an output of the first temperature sensitive unit at the target temperature in block 470. For example, the processing unit may utilize the temperature bias of the temperature sensitive unit (as determined in the methods 400a, 400b) to compensate the output of the temperature sensitive unit.

In block 472, the processing unit may determine the performance of the temperature sensitive unit based on the compensated output. Evaluating the performance may include, for example, determining whether the compensated output matches an expected output of the temperature sensitive unit at the target temperature, or over a range of temperatures.

In determination block 454, the processing unit may determine whether all of the plurality of target temperatures have been selected. In response to determining that not all of the plurality of target temperatures have been selected (i.e., determination block 454="No"), the processing unit may select another target temperature in block 450. In other words, the processing unit repeats the performance testing with another target temperature.

In response to determining that all of the plurality of target temperatures have been selected (i.e., determination block 454="Yes"), the processing unit may stop the testing process in block 474.

In some embodiments, one processing unit may be used to heat the temperature sensitive unit while another processing unit may be used to determine the load to execute on the processing unit that is heating the temperature sensitive unit. For example, a central processing unit (CPU) may control a processor in a RF power amplifier to vary the transmit power, which generates heat that may be used to heat a temperature sensitive unit. More generally, a second processing unit may measure the current temperature of the temperature sensitive unit and determine a load to execute on a first processing unit based on the current temperature and a target temperature. The second processing unit may then control the first processing unit to execute a thread with the determined load to heat the temperature sensitive unit.

In some embodiments, the processing unit may be used to calibrate or test more than one temperature sensitive unit. For example, the processing unit may measure the current temperature of a plurality of temperature sensitive units and execute a load that is based on the current temperatures of each of the plurality of temperature sensitive units and a target temperature for each temperature sensitive unit. For example, the load may be based on the average current temperature of the plurality of temperature sensitive units and the average difference between the target temperature and the current temperature of each of the plurality of temperature sensitive units.

In some embodiments, multiple processing units may be used to heat a single temperature sensitive unit. For example, if multiple processing units are located in different locations relative to the temperature sensitive unit, heating the multiple processing units may cause a faster and/or more even temperature increase of the temperature sensitive unit. There may be one processing unit that controls the load executed on each of the plurality of processing units based on the current temperature of the temperature sensitive unit and a target temperature. For example, the load may be evenly distributed across all the processing units, or may be based on the distance from the temperature sensitive unit and each processing unit, or may be based on the thermal coupling strength between the temperature sensitive unit and each processing unit.

Various embodiments may be implemented within a variety of electronic devices and applications. Some non-limiting examples include an avionics module or SoC of a UAV and mobile communication devices. As used herein, the term "mobile communication device" refers to any one or all of cellular telephones, smart phones, personal or mobile multimedia players, personal data assistants, laptop computers, tablet computers, smart books, smart watches, palm-top computers, wireless electronic mail receivers, multimedia Internet-enabled cellular telephones, wireless gaming controllers, and similar personal electronic devices that may include an oscillator unit, accelerometers, gyroscopes or other temperature-sensitive components.

Figure 5:
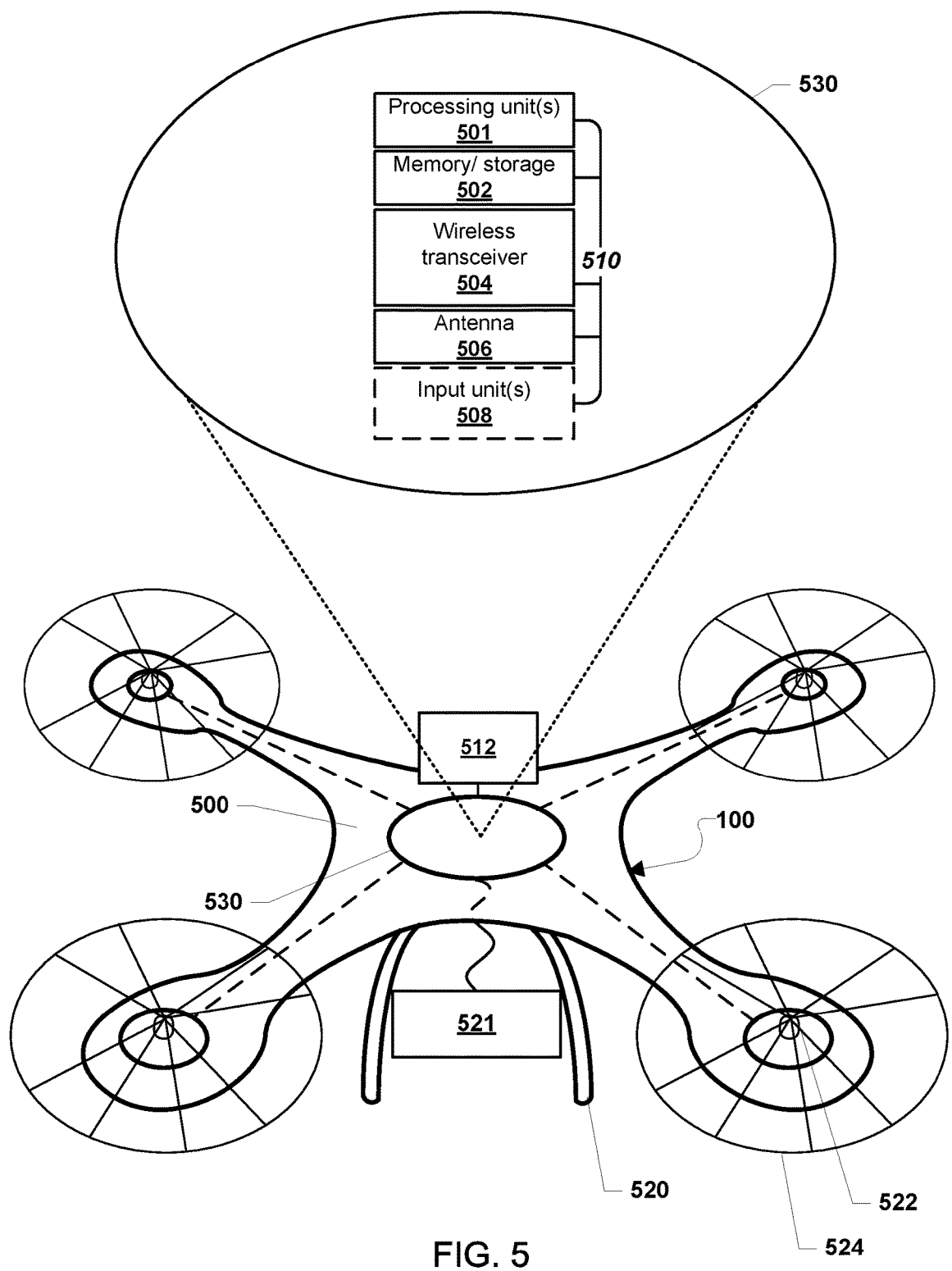
FIG. 5 is a component block diagram of a UAV suitable for use with various embodiments.

UAVs, an example of which in the form of a four-rotor UAV is illustrated in FIG. 5 that is suitable for use with various embodiments. With reference to FIGS. 1-5, the UAV 100 may include a body 500 (i.e., fuselage, frame, etc.) that may be made out of any combination of plastic, metal, or other materials suitable for flight. The body 500 may include a processor 530 that is configured to monitor and control the various functionalities, subsystems, and/or other components of the UAV 100. For example, the processor 530 may be configured to monitor and control various functionalities of the UAV 100, such as any combination of modules, software, instructions, circuitry, hardware, etc. related to propulsion, navigation, power management, sensor management, and/or stability management.

The processor 530 may include one or more processing units 501, such as one or more processors configured to execute processor-executable instructions (e.g., applications, routines, scripts, instruction sets, etc.), a memory and/or storage unit 502 configured to store data (e.g., flight plans, obtained sensor data, received messages, applications, etc.), and a wireless transceiver 504 and antenna 506 for transmitting and receiving wireless signals (e.g., a Wi-Fi® radio and antenna, Bluetooth®, RF, etc.). In some embodiments, the UAV 100 may also include components for communicating via various wide area networks, such as cellular network transceivers or chips and associated antenna (not shown). In some embodiments, the processor 530 of the UAV 100 may further include various input units 508 for receiving data from human operators and/or for collecting data indicating various conditions relevant to the UAV 100. For example, the input units 508 may include camera(s), microphone(s), location information functionalities (e.g., a GPS receiver for determining GPS coordinates), flight instruments (e.g., attitude indicator(s), gyroscope(s), accelerometer(s), altimeter(s), compass(es), etc.), keypad(s), etc. The various components of the processor 530 may be connected via a bus 510 or other similar circuitry.

The body 500 may include landing gear 520 of various designs and purposes, such as legs, skis, wheels, pontoons, etc. The body 500 may also include a payload mechanism 521 configured to hold, hook, grasp, envelope, and otherwise carry various payloads, such as boxes.

The UAV 100 may be of a helicopter design that utilizes one or more rotors 524 driven by corresponding motors 522 to provide lift-off (or take-off) as well as other aerial movements (e.g., forward progression, ascension, descending, lateral movements, tilting, rotating, etc.). The UAV 100 may utilize various motors 522 and corresponding rotors 524 for lifting off and providing aerial propulsion. For example, the UAV 100 may be a "quad-copter" that is equipped with four motors 522 and corresponding rotors 524. The motors 522 may be coupled to the processor 530 and thus may be configured to receive operating instructions or signals from the processor 530.

The body 500 may include a power source 512 that may be coupled to and configured to power the various other components of the UAV 100. For example, the power source 512 may be a rechargeable battery for providing power to operate the motors 522, the payload mechanism 521, and/or the units of the processor 530.

Figure 6:
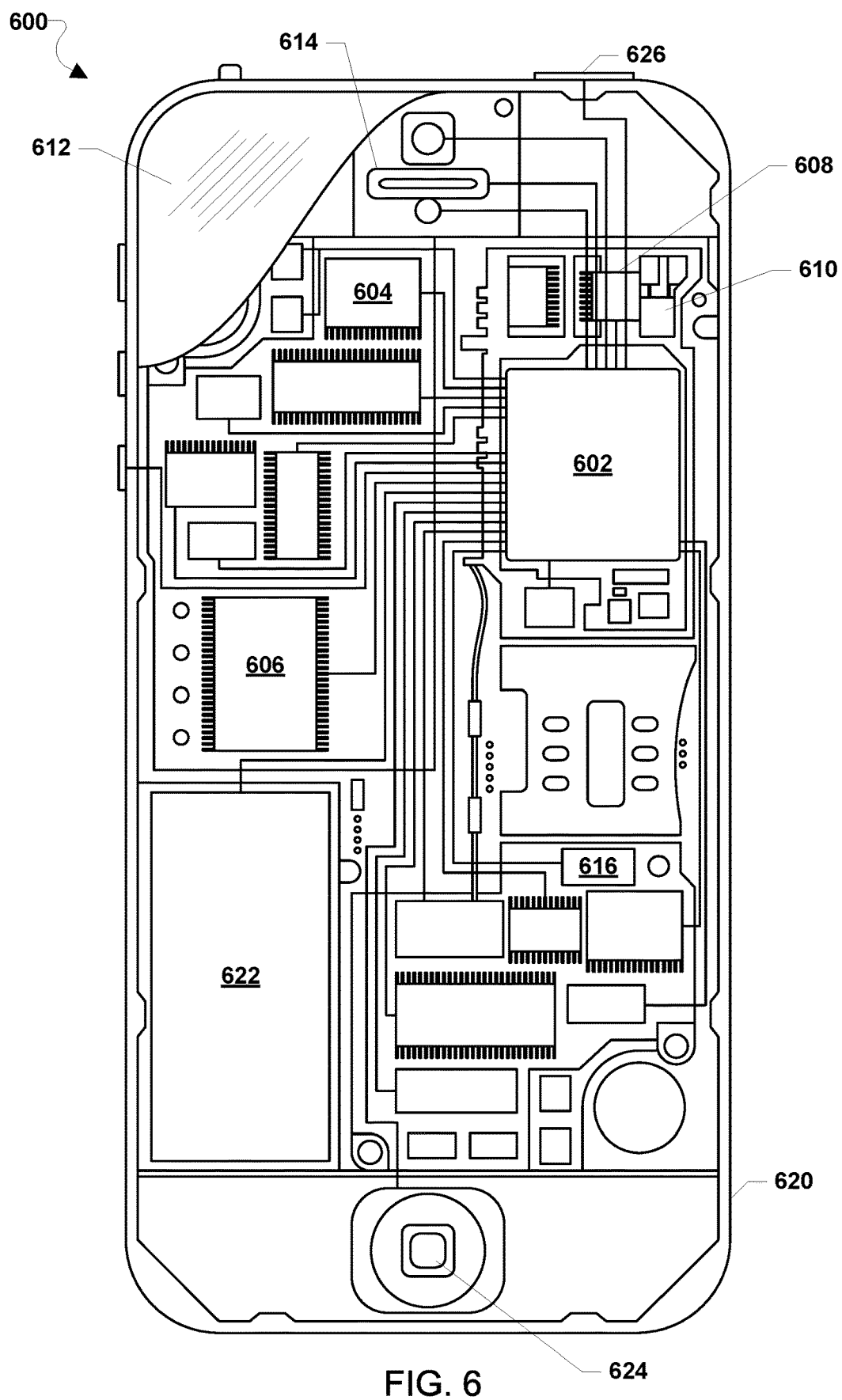
FIG. 6 is a component block diagram of a mobile communication device suitable for use with various embodiments.

Various examples may be implemented in any of a variety of mobile communication devices, an example of which (e.g., mobile communication device 600) is illustrated in FIG. 6. With reference to FIGS. 1-6, the mobile communication device 600 may be similar to the mobile communication device 200 and may implement the methods 400a, 400b, 400c, and 400d.

The mobile communication device 600 may include a processor 602 coupled to a touchscreen controller 604 and an internal memory 606. The processor 602 may be one or more multi-core integrated circuits designated for general or specific processing tasks. The internal memory 606 may be volatile or non-volatile memory, and may also be secure and/or encrypted memory, or unsecure and/or unencrypted memory, or any combination thereof. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the mobile communication device 600 need not have touch screen capability.

The mobile communication device 600 may have one or more cellular network transceivers 608 coupled to the processor 602 and to one or more antennas 610 and configured for sending and receiving cellular communications. The one or more transceivers 608 and the one or more antennas 610 may be used with the above-mentioned circuitry to implement various example methods. The mobile communication device 600 may include one or more SIM cards 616 coupled to the one or more transceivers 608 and/or the processor 602 and may be configured as described above.

The mobile communication device 600 may also include speakers 614 for providing audio outputs. The mobile communication device 600 may also include a housing 620, constructed of a plastic, metal, or a combination of materials, for containing all or some of the components discussed herein. The mobile communication device 600 may include a power source 622 coupled to the processor 602, such as a disposable or rechargeable battery. The rechargeable battery may also be coupled to the peripheral device connection port to receive a charging current from a source external to the mobile communication device 600. The mobile communication device 600 may also include a physical button 624 for receiving user inputs. The mobile communication device 600 may also include a power button 626 for turning the mobile communication device 600 on and off.

The various processors described herein may be any programmable microprocessor, microcomputer or multiple processor chip or chips that can be configured by software instructions (applications) to perform a variety of functions, including the functions of various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read only memory (ROM), electrically erasable programmable ROM (EEPROM), FLASH memory, compact disc ROM (CD-ROM) or other optical disk storage, magnetic disk storage or other magnetic storage smart objects, or any other medium that may be used to store desired program code in the form of instructions or data structures and that may be accessed by a computer. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method for performing temperature calibration of a first temperature sensitive unit within an electronic device having a first processing unit that is thermally coupled to the first temperature sensitive unit, the method comprising:
    determining a current temperature of the first temperature sensitive unit;
    determining a processing load for the first processing unit based on the current temperature and a target temperature;
    applying the determined processing load to the first processing unit to vary a temperature of the first temperature sensitive unit;
    determining whether the first temperature sensitive unit has reached the target temperature for a threshold amount of time; and
    determining a temperature bias for the first temperature sensitive unit at the temperature of the first temperature sensitive unit based on an output of the first temperature sensitive unit, wherein determining the temperature bias for the first temperature sensitive unit at the temperature of the first temperature sensitive unit based on the output of the first temperature sensitive unit is performed in response to determining that the first temperature sensitive unit has reached the target temperature for the threshold amount of time.

2. The method of claim 1, further comprising correcting the output of the temperature sensitive unit based on the temperature bias and a current temperature.

3. The method of claim 1, wherein:
    applying the determined processing load to the first processing unit comprises executing a thread on the first processing unit to achieve the determined processing load.

4. The method of claim 1, wherein:
applying the determined processing load to the first processing unit comprises executing a thread on the first processing unit according to a duty cycle to achieve the determined processing load.

5. The method of claim 4, wherein executing the thread on the first processing unit according to the duty cycle comprises executing dummy instructions based on a clock cycle of the first processing unit.

6. The method of claim 1, wherein determining the processing load for the first processing unit based on the current temperature and the target temperature comprises determining the processing load for the first processing unit based on the target temperature and a difference between the target temperature and the current temperature.

7. The method of claim 1,
wherein in response to determining that the first temperature sensitive unit has not reached the target temperature for the threshold amount of time:
re-determining the current temperature of the first temperature sensitive unit;
re-determining the processing load for the first processing unit based on the current temperature and the target temperature; and
applying the re-determined processing load on the first processing unit.

8. The method of claim 7, further comprising:
selecting the target temperature from a plurality of target temperatures;
determining whether all of the plurality of target temperatures have been selected after determining the temperature bias for the first temperature sensitive unit at the selected target temperature;
in response to determining that not all of the plurality of target temperatures have been selected:
selecting another target temperature among the plurality of target temperatures;
determining the processing load for the first processing unit based on the current temperature and the selected target temperature;
applying the determined processing load to the first processing unit to bring the temperature of the first temperature sensitive unit to the selected target temperature; and
determining the temperature bias for the first temperature sensitive unit at the selected target temperature based on the output of the first temperature sensitive unit; and
determining a temperature bias curve for the first temperature sensitive unit based on temperature biases determined at each of the plurality of target temperatures in response to determining that all of the plurality of target temperatures have been selected.

9. The method of claim 8, further comprising adjusting a rate of increase in temperature of the first temperature sensitive unit by adjusting the threshold amount of time at which the first temperature sensitive unit is held at each selected target temperatures before determining the temperature bias for the first temperature sensitive unit at each selected target temperature.

10. The method of claim 1, wherein the first processing unit is one of a central processing unit, a graphics processing unit, a digital signal processor, a power amplifier, an encoder, and a decoder.

11. The method of claim 1, wherein the first temperature sensitive unit is one of an inertial measurement unit, an oscillator, a power amplifier, and a radio frequency resource.

12. The method of claim 1, further comprising:
determining a current temperature of a plurality of temperature sensitive units including the first temperature sensitive unit;
determining the processing load for the first processing unit based on the current temperature of each of the plurality of temperature sensitive units and a target temperature of each of the plurality of temperature sensitive units;
applying the determined processing load to the first processing unit to vary a temperature of the each of the plurality of temperature sensitive units; and
determining a temperature bias for each of the plurality of temperature sensitive units at the temperature of each of the plurality of temperature sensitive units based on an output of each of the plurality of temperature sensitive units.

13. The method of claim 1, further comprising:
determining a processing load for a plurality of processing units including the first processing unit based on the current temperature of the first temperature sensitive unit and the target temperature; and
applying the determined processing load to each of the plurality of processing units to vary the temperature of the first temperature sensitive unit.

14. The method of claim 1, wherein determining the current temperature of the first temperature sensitive unit, determining the processing load for the first processing unit, and determining the temperature bias for the first temperature sensitive unit is performed by a second processing unit in the electronic device.

15. The method of claim 1, further comprising:
varying the temperature of the first temperature sensitive unit by varying a load on the first processing unit during run time.

16. An electronic device, comprising:
a first temperature sensitive unit; and
a first processing unit thermally coupled to the first temperature sensitive unit, wherein the first processing unit is configured with processor-executable instructions to:
determine a current temperature of the first temperature sensitive unit;
determine a processing load for the first processing unit based on the current temperature and a target temperature;
apply the determined processing load to the first processing unit to vary a temperature of the first temperature sensitive unit;
determine whether the first temperature sensitive unit has reached the target temperature for a threshold amount of time; and
determine a temperature bias for the first temperature sensitive unit at the temperature of the first temperature sensitive unit based on an output of the first temperature sensitive unit, wherein determining the temperature bias for the first temperature sensitive unit at the temperature of the first temperature sensitive unit based on the output of the first temperature sensitive unit is performed in response to determining that the first temperature sensitive unit has reached the target temperature for the threshold amount of time.

17. The electronic device of claim 16, wherein the first processing unit is further configured with processor-executable instructions to apply the determined processing load to the first processing unit by executing a thread on the first processing unit to achieve the determined processing load.

18. The electronic device of claim 16, wherein the first processing unit is further configured with processor-executable instructions to apply the determined processing load to the first processing unit by executing a thread on the first processing unit according to a duty cycle to achieve the determined processing load.

19. The electronic device of claim 18, wherein the first processing unit is further configured with processor-executable instructions to execute the thread on the first processing unit according to the duty cycle by executing dummy instructions based on a clock cycle of the first processing unit.

20. The electronic device of claim 16, wherein the first processing unit is further configured with processor-executable instructions to determine the processing load for the first processing unit based on the current temperature and the target temperature by determining the processing load for the first processing unit based on the target temperature and a difference between the target temperature and the current temperature.

21. The electronic device of claim 16, wherein the first processing unit is further configured with processor-executable instructions to:
   in response to determining that the first temperature sensitive unit has not reached the target temperature for the threshold amount of time:
      re-determine the current temperature of the first temperature sensitive unit;
      re-determine the processing load for the first processing unit based on the current temperature and the target temperature; and
      apply the re-determined processing load on the first processing unit.

22. The electronic device of claim 21, wherein the first processing unit is further configured with processor-executable instructions to:
   select the target temperature from a plurality of target temperatures;
   determine whether all of the plurality of target temperatures have been selected after determining the temperature bias for the first temperature sensitive unit at the selected target temperature;
   in response to determining that not all of the plurality of target temperatures have been selected:
      select another target temperature among the plurality of target temperatures;
      determine the processing load for the first processing unit based on the current temperature and the selected target temperature;
      apply the determined processing load to the first processing unit to bring the temperature of the first temperature sensitive unit to the selected target temperature; and
      determine the temperature bias for the first temperature sensitive unit at the selected target temperature based on the output of the first temperature sensitive unit; and
   determine a temperature bias curve for the first temperature sensitive unit based on temperature biases determined at each of the plurality of target temperatures in response to determining that all of the plurality of target temperatures have been selected.

23. The electronic device of claim 22, wherein the first processing unit is further configured with processor-executable instructions to:

adjust a rate of increase in temperature of the first temperature sensitive unit by adjusting the threshold amount of time at which the first temperature sensitive unit is held at each selected target temperature before determining the temperature bias for the first temperature sensitive unit at each selected target temperature.

24. The electronic device of claim 16, wherein the first processing unit is one of a central processing unit, a graphics processing unit, a digital signal processor, a power amplifier, an encoder, and a decoder.

25. The electronic device of claim 16, wherein the first temperature sensitive unit is one of an inertial measurement unit, an oscillator, a power amplifier, and a radio frequency resource.

26. The electronic device of claim 16, wherein the first processing unit is further configured with processor-executable instructions to:
   determine a current temperature of a plurality of temperature sensitive units including the first temperature sensitive unit;
   determine the processing load for the first processing unit based on the current temperature of each of the plurality of temperature sensitive units and a target temperature of each of the plurality of temperature sensitive units;
   apply the determined processing load to the first processing unit to vary a temperature of the each of the plurality of temperature sensitive units; and
   determine a temperature bias for each of the plurality of temperature sensitive units at the temperature of each of the plurality of temperature sensitive units based on an output of each of the plurality of temperature sensitive units.

27. The electronic device of claim 16, wherein the first processing unit is further configured with processor-executable instructions to:
   determine a processing load for a plurality of processing units including the first processing unit based on the current temperature of the first temperature sensitive unit and the target temperature; and
   apply the determined processing load to each of the plurality of processing units to vary the temperature of the first temperature sensitive unit.

28. The electronic device of claim 16, wherein the electronic device comprises a second processing unit configured with processor-executable instructions to determine the current temperature of the first temperature sensitive unit, determine the processing load for the first processing unit, and determine the temperature bias for the first temperature sensitive unit.

29. A method for performing temperature-based performance testing of a temperature sensitive unit within an electronic device having a processing unit that is thermally coupled to the temperature sensitive unit, the method comprising:
   determining a current temperature of the temperature sensitive unit;
   determining a processing load for the processing unit based on the current temperature and a target temperature;
   applying the determined processing load to the processing unit to vary a temperature of the temperature sensitive unit;
   determining whether the first temperature sensitive unit has reached the target temperature for a threshold amount of time;

compensating an output of the temperature sensitive unit at the target temperature, wherein compensating an output of the temperature sensitive unit at the target temperature is performed in response to determining that the first temperature sensitive unit has reached the target temperature for the threshold amount of time; and determining a performance for the temperature sensitive unit at the target temperature based on the compensated output.

30. An electronic device, comprising:

a temperature sensitive unit; and a processing unit thermally coupled to the temperature sensitive unit, wherein the processing unit is configured with processor-executable instructions to:

determine a current temperature of the temperature sensitive unit;

determine a processing load for the processing unit based on the current temperature and a target temperature;

apply the determined processing load to the processing unit to vary a temperature of the temperature sensitive unit;

determine whether the first temperature sensitive unit has reached the target temperature for a threshold amount of time;

compensate an output of the temperature sensitive unit at the target temperature, wherein compensating an output of the temperature sensitive unit at the target temperature is performed in response to determining that the first temperature sensitive unit has reached the target temperature for the threshold amount of time; and determine a performance for the temperature sensitive unit at the target temperature based on the compensated output.

* * * * *